(12) United States Patent
Mancevski

(10) Patent No.: US 7,610,797 B2
(45) Date of Patent: Nov. 3, 2009

(54) CARBON NANOTUBE DETECTION SYSTEM

(75) Inventor: Vladimir Mancevski, Austin, TX (US)

(73) Assignee: Xidex Corporation, Austin, TX (US)

( * ) Notice: Subject to any disclaimer, the term of this patent is extended or adjusted under 35 U.S.C. 154(b) by 0 days.

(21) Appl. No.: 11/985,701

(22) Filed: Nov. 16, 2007

(65) Prior Publication Data

US 2008/0083270 A1 Apr. 10, 2008

Related U.S. Application Data

(63) Continuation of application No. 11/346,124, filed on Feb. 2, 2006, now abandoned, which is a continuation of application No. 10/744,872, filed on Dec. 22, 2003, now Pat. No. 7,137,291, which is a continuation of application No. 09/881,650, filed on Jun. 13, 2001, now Pat. No. 6,666,075, which is a continuation-in-part of application No. 09/499,101, filed on Feb. 4, 2000, now abandoned.

(60) Provisional application No. 60/118,756, filed on Feb. 5, 1999.

(51) Int. Cl.
*G01N 13/10* (2006.01)
*G12B 21/02* (2006.01)

(52) U.S. Cl. .................. 73/105; 850/40; 850/58; 977/742; 977/842; 977/876

(58) Field of Classification Search ............... 73/105; 850/5, 40, 41, 58; 977/742, 746, 842, 876
See application file for complete search history.

(56) References Cited

U.S. PATENT DOCUMENTS

| | | | |
|---|---|---|---|
| 4,883,959 A * | 11/1989 | Hosoki et al. .................. 850/1 |
| 5,171,992 A | 12/1992 | Clabes et al. | |
| 5,267,471 A | 12/1993 | Abraham et al. | |
| 5,394,741 A | 3/1995 | Kajimura et al. | |
| 5,461,907 A | 10/1995 | Tench et al. | |
| 5,468,959 A * | 11/1995 | Tohda et al. ................... 850/3 |
| 5,503,010 A | 4/1996 | Yamanaka | |
| 5,515,719 A * | 5/1996 | Lindsay ....................... 73/105 |
| 5,519,212 A | 5/1996 | Elings et al. | |

(Continued)

FOREIGN PATENT DOCUMENTS

| DE | 19822634 | | 11/1999 |
|---|---|---|---|
| EP | 913508 | | 5/1999 |
| WO | WO 98/05920 | * | 2/1998 |

OTHER PUBLICATIONS

Wong, S.S. et al., "Carbon Nanotube Tips: High-Resolution Probes for Imaging Biological Systems", Journal of Americal Chemical Society, vol. 120, 1998, pp. 603-604.*

(Continued)

*Primary Examiner*—Daniel S Larkin

(57) ABSTRACT

A carbon nanotube detection system is disclosed. The detection system is suitable to detect carbon nanotube vibrations. Types of detection systems include but are not limited to: magnetic coupling to a magnetic particle attached at the distal end of the nanotube oscillator, current readout from the nanotube oscillator that has been exposed to electromagnetic radiation or a stress, inductive pick-up coil and corresponding tank circuit, capacitive readout element positioned next to the nanotube oscillator having a charged particle attached at its distal end, an optical beam illumination and detection of its scattering, or combination of any of the above means of detection.

9 Claims, 24 Drawing Sheets

U.S. PATENT DOCUMENTS

| | | | |
|---|---|---|---|
| 5,611,942 A | | 3/1997 | Mitsui et al. |
| 5,646,339 A | | 7/1997 | Bayer et al. |
| 5,670,712 A | * | 9/1997 | Cleveland et al. ............. 73/105 |
| 5,760,300 A | | 6/1998 | Kajimura et al. |
| 5,918,274 A | | 6/1999 | Chen et al. |
| 6,006,593 A | | 12/1999 | Yamanaka |
| 6,094,972 A | | 8/2000 | Yasutake et al. |
| 6,314,800 B1 | * | 11/2001 | Nishimura ................... 73/105 |
| 6,346,189 B1 | | 2/2002 | Dai et al. |
| 6,911,646 B1 | * | 6/2005 | Weitekamp ................ 250/234 |
| 2004/0168527 A1 | | 9/2004 | Nakayama et al. |

OTHER PUBLICATIONS

Dai, H. et al., "Nanotubes as Nanoprobes in Scanning Probe Microscopy", Nature, vol. 384, 1996, pp. 147-151.

Nagy, G. et al., "Carbon Nanotube Tipped Atomic Force Microscopy for Measurement of < 100 nm Etch Morphology on Semiconductors", Applied Physics Letters, vol. 73, No. 4, Jul. 1998, pp. 529-531.

Cheung, C.L. et al. "Carbon Nanotube Atomic Force Microscopy Tips: Direct Growth by Chemical Vapor Deposition and Application to High-Resolution Imaging", Proc. Natl. Acad. S vol. 97, No. 8, Apr. 2000, pp. 3809-3813.

* cited by examiner

US 7,610,797 B2

CARBON NANOTUBE DETECTION SYSTEM

CROSS-REFERENCE TO RELATED APPLICATION

This application is a continuation application of U.S. patent application Ser. No. 11/346,124, filed Feb. 2, 2006, now abandoned, which is a continuation of U.S. patent application Ser. No. 10/744,872, filed Dec. 22, 2003, now U.S. Pat. No. 7,137,291, which is a continuation application of U.S. patent application Ser. No. 09/881,650, filed Jun. 13, 2001, now U.S. Pat. No. 6,666,075, which is a continuation-in-part application of U.S. patent application Ser. No. 09/499,101, filed Feb. 4, 2000, now abandoned, and also claims the benefit under 35 U.S.C. §119(ed) of U.S. Provisional Patent Application No. 60/118,756, filed Feb. 5, 1999. The entire contents of the aforementioned applications are incorporated herein by reference.

This application is further related to commonly owned U.S. patent application Ser. No. 09/404,880, filed Sep. 24, 1999, now abandoned, entitled "Multi-Dimensional Sensing System for Atomic Force Microscopy", by Vladimir Mancevski, hereinafter referred to as "MANCEVSKI 1."

Furthermore, this application is also related to commonly owned U.S. patent application Ser. No. 09/407,394, filed Sep. 28, 1999, now U.S. Pat. No. 6,146,277, entitled "Method for Manufacturing Carbon Nanotubes as Functional Elements of MEMS Devices, by Vladimir Mancevski, hereinafter referred to as "MANCEVSKI2"

TECHNICAL FIELD OF THE INVENTION

The present invention relates generally to the field of force measurement using scanning probe microscopy (SPM) and, more particularly, to a force measurement system for determining the topography or composition of a local region of interest by means of scanning probe microscopy.

BACKGROUND OF THE INVENTION

Introduction of Terms used in this Disclosure

In this invention we use cartesian coordinate systems with perpendicular axes as the coordinate system of choice. Nevertheless, one may implement any other well-defined coordinate system including, for example, polar, cylindrical, or spherical coordinate system. The "global" coordinate system X Y Z 40 is fixed with the sample and the "local" coordinate system $X_{tip} Y_{tip} Z_{tip}$ 42 is fixed with the apex 45 of the tip 44 of the scanning probe 48. In general, the scanning probe tip apex 45 may have an arbitrary position and orientation with respect to the sample, therefore, the local coordinate system 42 also may have arbitrary position and orientation with respect to the global coordinate system 40, as shown in FIG. 1A. In a special case, the local 42 and global 40 coordinate systems may be aligned with respect to one another, as shown in FIG. 1B.

The origin of the local coordinate system 42 is at the apex 45 of the tip 44. The $Z_{tip}$ axis 46 is oriented along the length of the tip 44 and is perpendicular to a region of the oscillator 48 surface near the place where the tip 44 is attached. The $X_{tip}$ axis 50 is parallel to the long axis of the oscillator 48. The $Y_{tip}$ axis 52 is transverse with respect to the $X_{tip}$ axis 50 so as to form a right-handed cartesian coordinate system.

It is known that a dipole-dipole interaction occurs between pairs of atoms located in volumetric regions of the tip 44 and sample 54 when they are in proximity to each other. The associated force is called Van der Walls force. The resulting integrated effect encompasses all dipole-dipole interactions between pairs of atoms in sufficient proximity to generate a measurable interaction between the tip 44 and the sample 54. This resultant of the integrated dipole-dipole interaction is represented by a three-dimensional "tip-sample interaction force vector" 56 as shown in FIG. 2A. A single point can be used to approximate the volumetric region near the tip apex 45, and a flat surface can be used to approximate the region of the sample 54 in proximity to the tip 44, as shown in FIG. 2B. If the surface of the sample 54 is horizontal (i.e., in the XY plane) the tip-sample interaction force vector 56 will be vertical. However, if the surface of the sample 54 is vertical (e.g., in the XZ plane) the tip-sample interaction force vector 56 will be horizontal. For a general orientation of the surface of the sample 54, the tip-sample interaction force vector 56 will have three non-zero components, corresponding to the three axes XYZ of the global coordinate system 40. The tip-sample interaction force vector F 56 can be represented either by its components $F_{x\ tip}$, $F_{y\ tip}$, $F_{z\ tip}$ in the local coordinate system 42 or by its components $F_x$, $F_y$, $F_z$, in the global coordinate system 40.

In one possible mathematical representation, the 3×1 vector functions $\Phi_i$, for (i=1, 2, 3, . . . ∞), of the spatial coordinates (e.g., $X_{tip}\ Y_{tip}\ Z_{tip}$) represent mode shapes of the probe structure, and $q_i$ represent the corresponding generalized coordinates. In one instance of a classical modal analysis, the equations of motion of the probe are $$M_j d^2 q_j/dt^2 + M_j \omega_j^2 q_j - \Sigma_{i=1\ to\ \infty} F_{ij}' q_i = F_{0j}$$

Where (j=1, 2, 3, . . . ∞), $M_j$ is the modal mass, $\omega_j$ is the resonant frequency, and $F_{0j}$ is the static component of the generalized force corresponding to the tip-sample interaction force applied to the probe tip. The term $-\Sigma_{i=1\ to\ \infty} F_{ij}' q_i$ can be interpreted as a negative spring force which alters the $j^{th}$ resonant frequency of the vibrating probe. The quantity $F_{ij}'$ can be represented in terms of the mode shapes by $$F_{ij}' = [A] \Phi_i(tip) \bullet \Phi_j(tip).$$

Where [A] is a 3×3 coefficient matrix arising from classical modal analysis and the symbol • denotes an inner product of two vectors.

The vector [A] $\Phi_i$ (tip), derived from classical modal analysis, is an example of a more general vector quantity that we call a "resultant surface force interaction." Our use of the term "resultant surface force interaction" is not limited to any particular physical origin of the tip-sample interaction force and may include, for example, both conservative and non-conservative tip-sample interaction forces.

FIG. 3A shows typical orientations of three selected mode shape vectors, evaluated at spatial coordinates corresponding to the apex 45 of a probe tip 44. In this example, $\Phi_1$ (tip) 58 represents the direction in which the tip apex 45 moves when the main bending mode is excited, $\Phi_2$ (tip) 60 represents the direction in which the tip apex 45 moves when the first torsional mode is excited and $\Phi_3$ (tip) 62 represents the direction in which the tip apex 45 moves when the second bending mode is excited. For a suitably chosen structural design of the probe 48 and tip apex 45 location, and for small-amplitude vibrations, $\Phi_3$ (tip) 62, $\Phi_2$ (tip) 60 and $\Phi_1$ (tip) 58 are each substantially aligned with the unit vectors, $i_{tip}$ 64, $j_{tip}$ 66, and $k_{tip}$ 68, respectively, and the modal coordinates $q_3$, $q_2$, $q_1$, can be approximated by tip 44 displacements along the in the $X_{tip}$ 50 $Y_{tip}$ 52 $Z_{tip}$ 46 axes respectively. In this example the resultants of the surface force interaction can be given a geometric interpretation as vectors aligned along the $X_{tip}$ 50 $Y_{tip}$ 52 $Z_{tip}$ 46 axes.

The resultant surface force interaction vectors $F'_{x\ tip}$ 70, $F'_{y\ tip}$ 72 and $F'_{z\ tip}$ 74 can, in some cases, be modeled by the three virtual springs with variable spring constants $k_1$ 76, $k_2$ 78, and $k_3$ 80 that are functions of the tip-surface distance, as shown in FIG. 3B. The vector F' 82 shown in FIG. 3C is the sum of the three resultant surface force interaction vectors. As the force axis 84 and the distance axis 86 show in FIGS. 4A and 4B, the force-distance curve 88 shows that the resultant surface force is non-linear with respect to the tip-surface distance. Therefore, the modeled spring constants are also non-linear. However, for small amplitudes of vibration of the oscillator tip 44, the spring constants are linear with respect to the tip-surface distance. To maintain linear response, the oscillator 48 should vibrate with sufficiently small amplitude to keep the oscillator in a linear regime of operation, shown by area of measurement 90. Contrast that with area of measurement 92, used in tapping mode. Force axis 84 shows repulsive force 94 and attractive force 96.

The term "oscillator," as used in conjunction with the present invention, represents a scanning probe 48 for which multiple resonant modes are intended to be used for force sensing. The term "cantilever" refers to a scanning probe 48 for which only the primary bending (i.e., "cantilever") mode is intended to be used for force sensing, even though, in general, the probe 48 structure would exhibit multiple resonant modal responses if excited at the appropriate driving frequencies.

The term "force sensor" refers to the resonating oscillator 48 and its sensitivity to surface forces 82 associated with the tip-sample interactions. The purpose of the force sensor is to enable detection of the surface topology or composition by means of coupling the scanning probe tip 44 to the surface of the sample 54 via a tip-sample interaction force 82. In general, the interaction force 82 between the tip 44 and the sample 54 is a non-linear function of the tip-surface gap that includes the dipole-dipole interaction described above (which is conservative and hence describable by a potential), plus additional contributions from other conservative forces (e.g. electrostatic and magnetic forces) and non-conservative forces (e.g., meniscus forces and other forces due to surface contamination). However, whatever its origin in terms of atomic interactions, molecular interactions or other surface physics phenomena, the tip-sample interaction force vector 56 can still be represented by a vector composed of three generally non-zero components, corresponding to the three axes XYZ of the global coordinate system 40. Alternatively, the tip-sample interaction force 82 can be represented by a vector 56 composed of three generally non-zero components, corresponding to the three axes $X_{tip}$ $Y_{tip}$ $Z_{tip}$ of the local coordinate system 42. Equal and opposite tip-sample interaction forces 82 act on the tip 44 and sample 54, respectively, consistent with Newton's law of action and reaction.

"Force sensing" occurs when the surface force interaction alters the effective elastic restoring force associated with one or more resonant modes of the primary probe 48 structure so as to shift the respective natural frequencies of its resonant modes. The shifts in natural frequency can be sensed, for example, by monitoring either the amplitudes or phases of the respective modal oscillations.

When using the term "at" in the claims herein to describe a positional relationship between two objects, the term "at" is intended to be interpreted as meaning: (i) contacting the surface 54 or (ii) located near to but not contacting the surface 54. For example, when a SPM tip 44 is "at" a sample surface 54 during a scan, the tip 44 may be contacting the surface 54 (as in contact or tapping mode testing), or the tip 44 may be located near to the surface 54 but without contacting the surface 54 (as in non-contact testing). As another example, when a distal end of a nanotube is "at" a surface 54 of a semiconductor integrated circuit, the distal end of the nanotube may be contacting or tapping the surface 54, or the distal end of the nanotube may be located near the surface 54 without contacting the surface 54.

BACKGROUND OF THE RELATED ART

A scanning probe typically consists of a primary probe structure 48, (which may be either an oscillator or a cantilever) and a high aspect-ratio, sharply-pointed tip 44 extending from its end. The tip 44 is generally much less massive than the primary probe structure 48. The function of the primary probe structure is to provide one resonant mode (in the case of a cantilever) or more than one resonant mode (in the case of an oscillator), which are utilized for force sensing. Typically, the primary probe structure 48 is about 100 microns long by 30 microns wide by 2 microns thick. The function of the tip 44 is to rigidly couple the primary probe structure 48 to a relatively small volumetric region (the tip apex 45) which can be positioned so as to interact with a relatively small region of the sample 54 in proximity to the tip apex 45. Typically, the tip 44 is an inverted cone or a pyramid with its apex 45 pointing towards the sample surface 54. Ideally, the apex 45 of the tip 44 would be a single atom that couples with the sample surface 54 via the tip-sample force interaction. In reality, the apex 45 of the tip 44 typically has a radius of about 10 nanometers, and the cone-shaped or pyramid-shaped tip 44 is typically a few microns long.

In conventional scanning probe microscopy (SPM), the force sensor is only sensitive to the resultant of the surface force interaction $F'_{z\ tip}$ 74, in the $Z_{tip}$ 46, direction, as illustrated in FIGS. 5A and 5B. The other two components of the surface force interaction vector, $F'_{x\ tip}$ 70 in $X_{tip}$ 50 direction and $F'_{y\ tip}$ 72 in the $Y_{tip}$ 52 direction, are not detected in conventional scanning probe microscopy. The XYZ and $X_{tip}$ $Y_{tip}$ $Z_{tip}$ coordinate systems are shown in FIGS. 5A and 5B as being aligned for ease of illustration. For conventional non-contact mode scanning, a SPM cantilever 48 is excited in its first bending mode with small amplitude, thereby causing the tip 44 to move within the attractive region of the surface force interaction profile. This region 90 is illustrated in FIG. 4A. In the conventional "tapping" mode, the amplitude of the cantilever 48 vibration is larger and the tip 44 dips in and out of both the attractive 96 and repulsive 94 regions of the surface force interaction region 92, as shown in FIG. 4B. A change in the tip-surface distance during the scanning process shifts the cantilever 48 resonance. A feedback loop uses the resonance shift to maintain either the amplitude or phase of the oscillation at a predetermined value. The output from the resulting scan is used to represent the topography or composition of the surface. Scanning of the probe in an XY raster plane while recording the response of the force sensor in Z direction can be used to construct a three-dimensional profile of the surface 54.

There are two major consequences of the failure of conventional SPMs to detect the surface force interaction in multiple directions: (1) the vertical and horizontal distance scales will be different due to a diminished projection of the surface force interaction vector onto the vertical axis when the sample surface is not horizontal, and (2) there will be loss of force sensor sensitivity over highly sloped sample surfaces. To illustrate these points, we examine a tip 44 that is oriented in the Z direction as it scans in the Y direction over a horizontal surface 54 in the XY plane, as shown in FIG. 6. In this scenario, the surface force interaction 82 will be in the Z direction when the surface 54 is horizontal. A conventional force sensor would drive the tip 44 at a constant surface force interaction set for scanning the horizontal surface. If the slope of the surface 54 changes, and with that the direction of the surface force interaction vector 82, the conventional force sensor would still only respond to the surface force interaction in the Z direction 74. However, for a tilted surface, the surface force interaction in the Z direction 74 is diminished by a factor equal to the cosine of the surface 54 slope angle representing the loss of the horizontal component 72 of the surface force interaction vector 82. The feedback controller of the conventional force sensor would keep the tip 44 over the sloped surface 54 at a constant surface force interaction level set for the horizontal surface 54. This misrepresentation will cause the tip 44 to be closer to a sloped surface 54 than to a horizontal surface 54, causing a distortion of the horizontal and vertical distance scales and a distortion of the surface 54 topography. This unwanted approach of the tip 44 to the surface 54 may also cause snapping of the tip to the surface. This snapping may damage the tip 44 or the sample 54.

Naturally, this problem is more emphasized when the surface is close to vertical or is vertical. For the case of a vertical surface, the surface force interaction occurs only in the horizontal direction. However, the conventional force sensor is only sensitive to a surface force interaction in the vertical direction. Therefore, the conventional force sensor loses its sensitivity over highly sloped surfaces and would not work for vertical or close to vertical surfaces.

One prior art embodiment, shown in FIG. 7, operates in a non-contact mode and has a cantilever 48 that resonates in the Z direction and dithers (a non-resonant vibration) in the Y direction. This approach is sufficient to enable force sensitivity in two directions. However, the force sensitivity in the lateral direction is not as good as the force sensitivity in the vertical direction. This is due to the use of dithering in the Y direction rather than use of a distinct resonant mode that can provide higher force sensitivity. If the sample surface 54 is vertical, the vertical surface force interaction vanishes completely which renders the dithering approach ineffective.

Therefore it would be desirable to operate a force sensor that provides force sensitivity in all three directions by means of distinct resonant modes.

All references cited herein are incorporated by reference to the maximum extent allowable by law. To the extent a reference may not be fully incorporated herein, it is incorporated by reference for background purposes, and indicative of the knowledge of one of ordinary skill in the art.

BRIEF SUMMARY OF THE INVENTION

The problems and needs outlined above are addressed by the present invention. In accordance with one aspect of the present invention, a scanning probe microscopy (SPM) tool is provided. The SPM tool comprises an oscillator, an SPM tip, a mechanical actuator, a sensing system, and a feedback control system. The oscillator having the SPM tip extending therefrom. The mechanical actuator is adapted to hold the oscillator and position the SPM tip relative to a sample. The oscillator has a selected shape, dimensions ratio, and/or material composition such that the oscillator comprises a first resonant mode for a first direction, wherein a first resonance of the first resonant mode can be altered by a surface force interaction between the SPM tip and the sample in the first direction; and a second resonant mode for a second direction, wherein a second resonance of the second resonant mode can be altered by the surface force interaction between the SPM tip and the sample in the second direction. The sensing system is adapted to sense the alterations in the first and second resonances, is adapted to provide a first output based on the alterations in the first resonance, and is adapted to provide a second output based on the alterations in the second resonance. The feedback control system is adapted to control the actuator based on the first and second outputs. Nanotubes can be grown from the tip to provide more advantages.

BRIEF DESCRIPTION OF THE DRAWINGS

Other objects and advantages of the invention will become apparent upon reading the following detailed description and upon referencing the accompanying drawings, in which:

FIGS. 14 and 15 also show the directions of tip motion for the first bending and first torsional modes of the oscillator;

DETAILED DESCRIPTION OF THE INVENTION

Figure 1A:
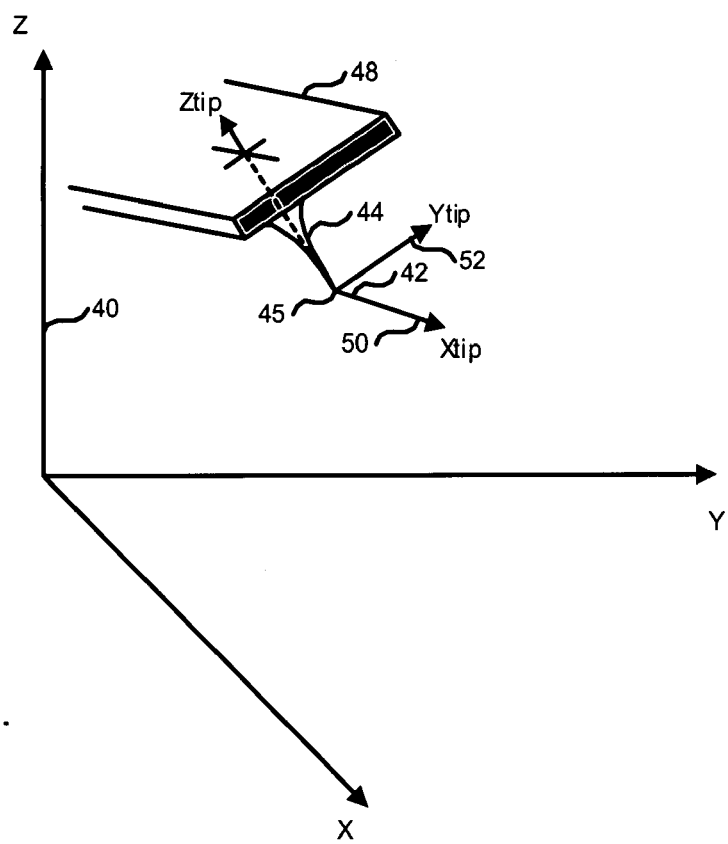
FIG. 1A shows a scanning probe tip with an arbitrary position and orientation with respect to a global coordinate system.
Figure 1B:
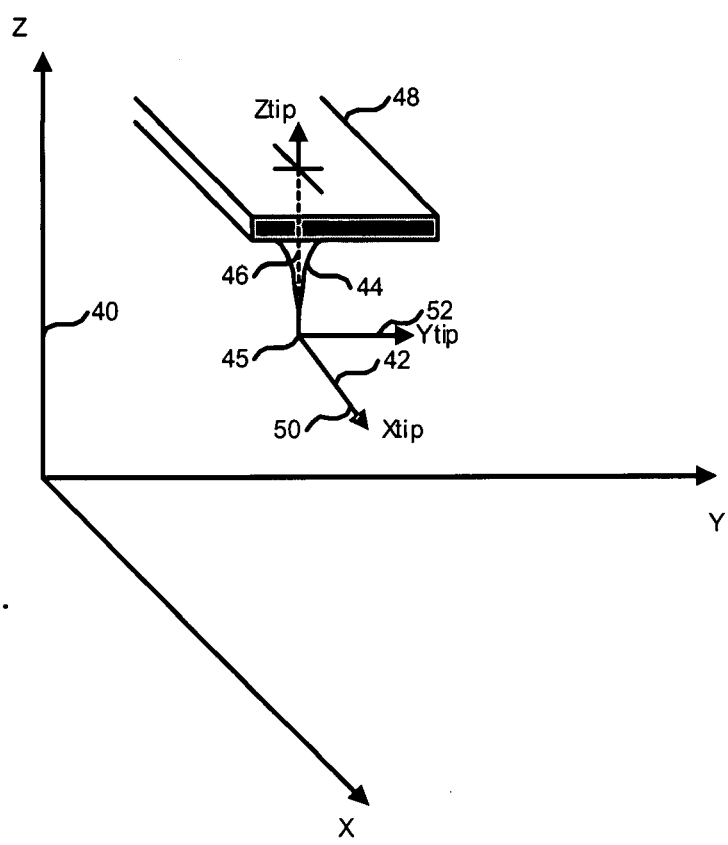
FIG. 1B shows a special case of FIG. 1A in which the local and global coordinate systems have the same orientation with respect to one another.
Figure 2A:
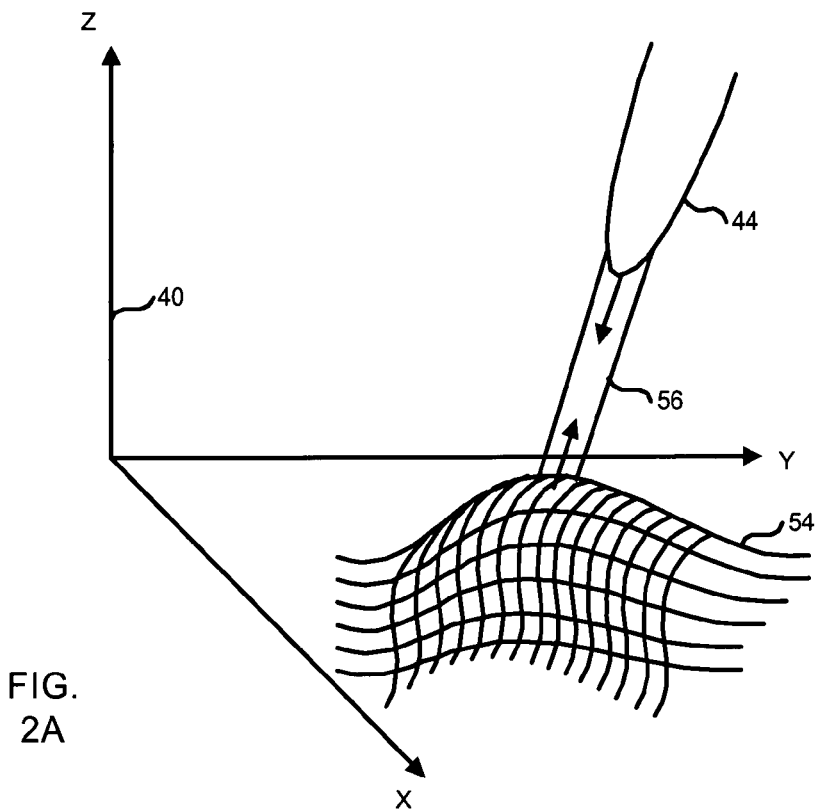
FIG. 2A shows the tip-sample interaction force vector as the resultant of the integrated dipole-dipole interaction.
Figure 2B:
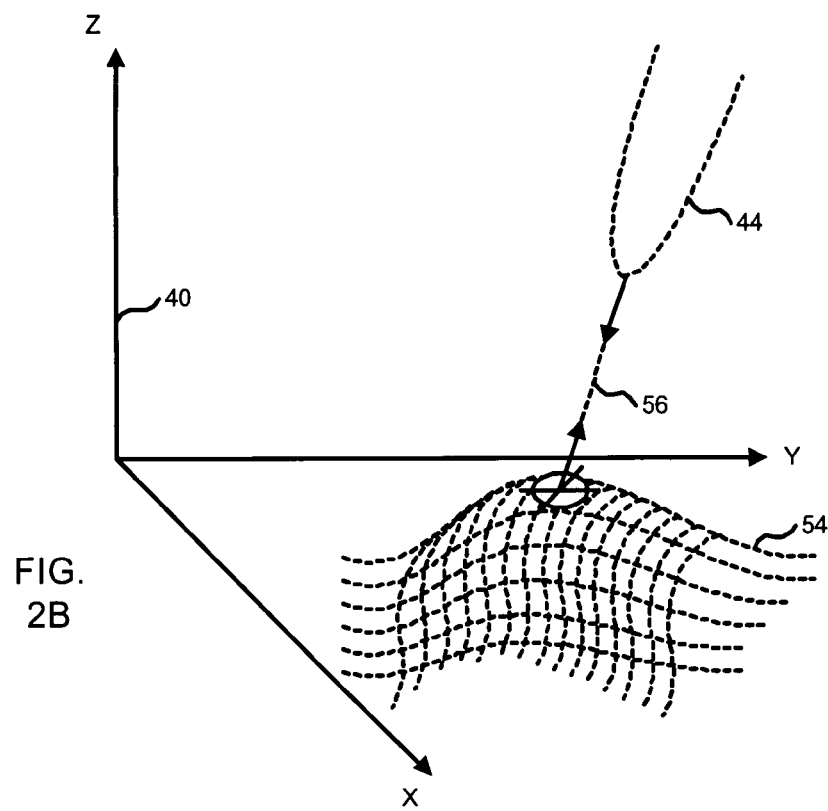
FIG. 2B shows a single point used to approximate the volumetric region near the tip apex, and shows a flat surface used to approximate the region of the sample in proximity to the tip apex.

Referring now to the drawings, wherein like reference numbers are used herein to designate like elements throughout the various views, embodiments of the present invention are illustrated and described, and other possible embodiments of the present invention are described. The figures are not necessarily drawn to scale, and in some instances the drawings have been exaggerated and/or simplified in places for illustrative purposes only. One of ordinary skill in the art will appreciate the many possible applications and variations of the present invention based on the following examples of possible embodiments of the present invention.

System and Method for Force Sensing with Sensitivity in Multiple Directions

The system and method for force sensing of the present invention relies on the use of at least two separate oscillator resonant modes to become sensitive in at least two directions (preferably $Y_{tip}$ and $Z_{tip}$), where the modal shape of the oscillator 48 and the location of the tip apex 45 determine the directions of the force sensor sensitivity. The shape, dimensions ratio, and/or material composition can be varied to change the direction of tip-surface force interaction sensitivity for a given natural frequency of the oscillator 48.

An embodiment of the present invention relies on the use of at least two separate oscillator resonant modes to become sensitive in at least two (preferably $Y_{tip}$ 52 and $Z_{tip}$ 46) directions.

A particular resonant shape and particular tip apex 45 location in a proximity to a three-dimensional surface 54 can provide a surface force interaction that will act only in the direction of the tip vibration altering the given resonance. For that particular resonant mode, the actual surface force interaction will not produce any work in any other axis but the axis of the vibration of the tip 44. Hence, the shape, dimensions ratio, and/or material composition of an oscillator 48 and/or the location of the probe tip 48, can be selected or designed so that the SPM probe is sensitive to predetermined directions or components of the tip-sample force interaction vector 56.

Preferably, an embodiment of the present invention can rely on the use of three separate oscillator resonant modes to become sensitive in three directions (or each axis of a cartesian coordinate system), where the modal shape of the oscillator 48 (shape and dimensions ratio), the material composition of the oscillator 48, and/or the location where the tip 44 portion extends from the oscillator 48 determine these directions (or axis).

Ideally, each oscillator resonant mode corresponds to a single direction of the force sensor sensitivity. However, each oscillator resonant mode may correspond to multiple (two or three) directions of the force sensor sensitivity. Preferably, the three directions are different from each other. Preferably, the three directions are perpendicular to each other.

Preferably, the three perpendicular directions are aligned with the $X_{tip}$ 50, $Y_{tip}$ 52, and $Z_{tip}$ 46 axes of the oscillator. The multiple directions (two or more) need not be perpendicular to each other. However, a choice of utilizing substantial perpendicular directions can allow transformations and calculations to be made much easier and faster.

For a given relative position and orientation between the local coordinate system 42 of the scanning probe 48 and a global coordinate system 40 of the sample surface 54 we can transform the directions of the force sensor sensitivity to any coordinate system of choice. Preferably, the coordinate system of choice is the global coordinate system 40 of the sample 54.

Advantages of the Present Invention

The present invention provides a force sensor that addresses the limitations of the conventional force sensors described in the background section of this disclosure. Described below are some of the advantages currently realized by the present invention, and there may be more advantages that will be later realized but are not described.

The force sensor of the present invention provides an important technical advantage by providing sensitivity to variations in resonant vibrations in two or more directions, in contrast to a conventional force sensor that is only sensitive to variations in resonant vibrations in one direction. Also, the present invention provides the ability to be sensitive to surface force interactions along three distinct axis (e.g. XYZ of a cartesian coordinate system), which provides the ability to perform three-dimensional, high-sensitivity scans to detect the contours of complex three-dimensional surfaces 54.

The advantage of the force sensor of the present invention is that it can determine the vertical and horizontal dimensions with equal distance scales irrespective of the slope of the sample surface 54. Additionally, the force sensor of this invention is capable of scanning over horizontal, near vertical, vertical, reentrant and other arbitrarily sloped surfaces 54. This makes scanning possible on complex surfaces 54 with curvatures, edges, corners, and undercuts, all of them in three-dimensional space. The advanced capabilities of the force sensor of this invention make it very suitable for high precision measurements required for metrology applications. In particular the invention is applicable for critical dimension measurements of semiconductor integrated circuits.

Multiresonant Oscillators

The key to the functioning of the present invention is the use of a multiresonant oscillator 48 with three separate oscillator resonant modes that enable force sensitivity in three directions.

The resonant modal shapes and a location of the tip 44 will define the directions in which the oscillator 48 is sensitive to surface force interactions. This establishes the design criteria for the multiresonant oscillator 48.

It is desirable to design an oscillator 48 that has distinct resonant modes that generate time-varying tip 44 displacement in three orthogonal directions, making each resonance primarily sensitive in only one orthogonal direction.

Preferably, the oscillator 48 should have at least three distinct resonant modes, where each resonant mode is ideally sensitive to surface force interactions in only one of the orthogonal directions (main effect) of the local coordinates 42, and is independent of surface force interactions in the other two orthogonal directions (cross-coupling effect). Some cross-coupling effect can be tolerated. In case of a cross-coupling effect, a carefully designed experiment can empirically determine the relationship, or cross-coupling, between the resonances and the surface force interactions in the three orthogonal directions. Furthermore, if the cross-coupling effect is at least an order of magnitude less than the main effect, the cross-coupling may be neglected. Otherwise, the feedback control system can and needs to compensate for cross-coupling effects.

It is desirable that the oscillator resonances have a high quality Q factor, that will enable detection of resonance shifts in response to surface force interactions. Failure to detect resonant frequency shifts can cause loss of control and snapping of the oscillator tip 44 against the surface 54.

Figure 9:
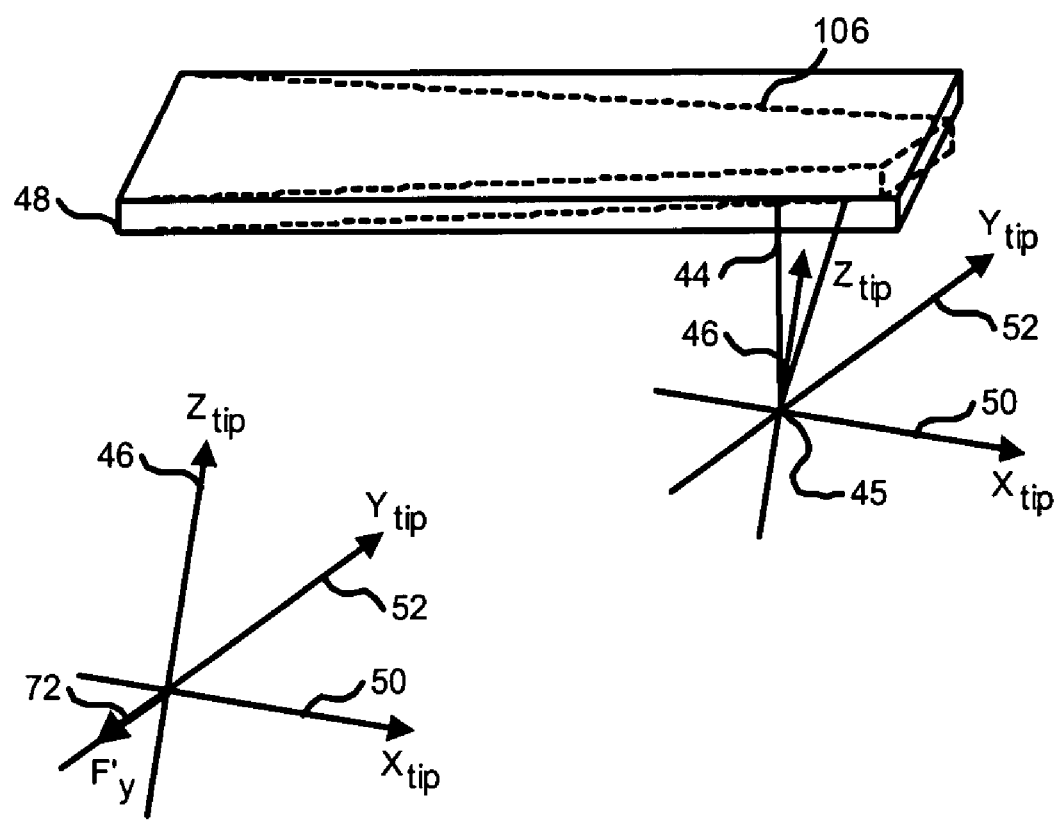
FIG. 9 shows the first torsional mode which generates tip vibration in the direction transverse to the long axis of the oscillator.
Figure 10:
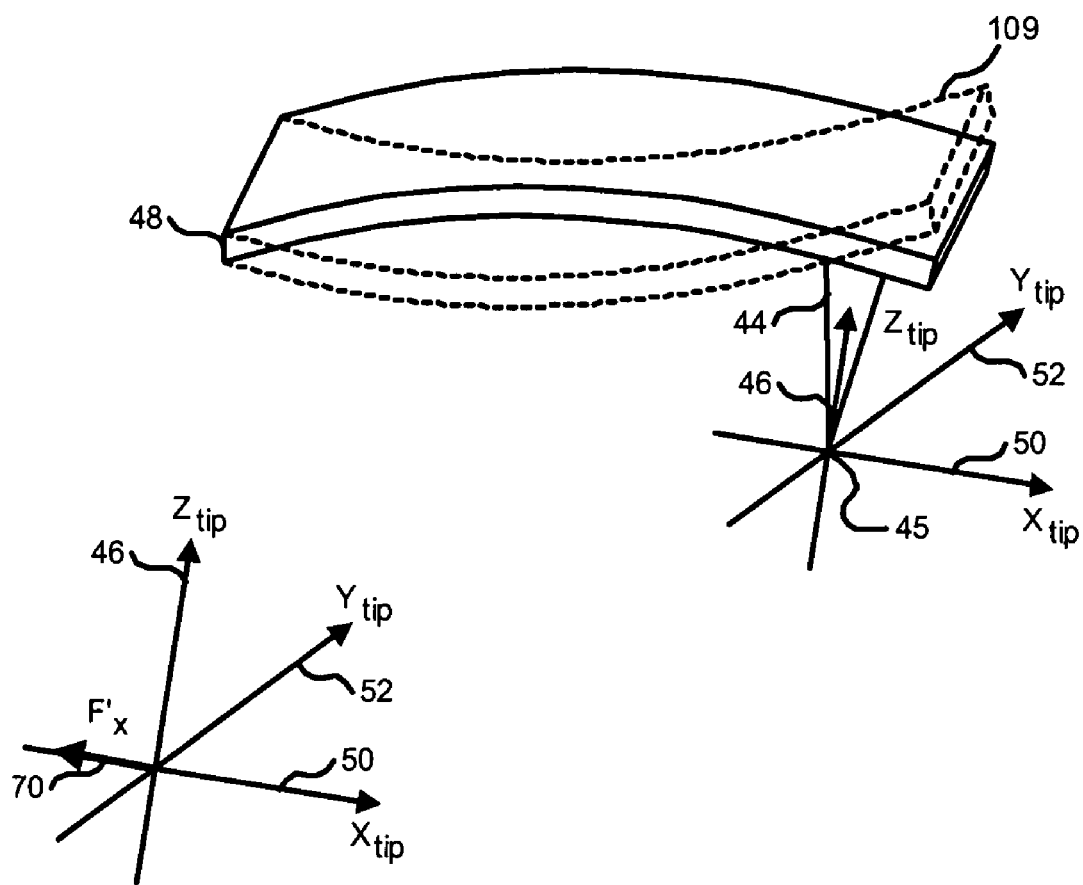
FIG. 10 shows the second bending mode which generates tip vibration in the direction along the long axis of the oscillator.

As shown in FIGS. 8-11, one of the embodiments of this innovation utilizes a simple diving-board shaped oscillator 48. Three resonant modes that produce three mutually orthogonal vibrations of the tip 44 are, for example, the first bending mode, the first torsional mode, and the second bending mode. The first bending mode generates tip vibrations in the $Z_{tip}$ direction 46 (FIG. 8) and the first torsional mode generates tip vibration in the $Y_{tip}$ direction 52 (FIG. 9). Alternatively, a first lateral bending mode of this oscillator can also be used to generate tip vibration in the $Y_{tip}$ direction 52. The second bending mode (FIG. 10), can be used to produce tip vibration that is orthogonal to the tip motion produced by the first bending mode and the first torsional mode.

Figure 11:
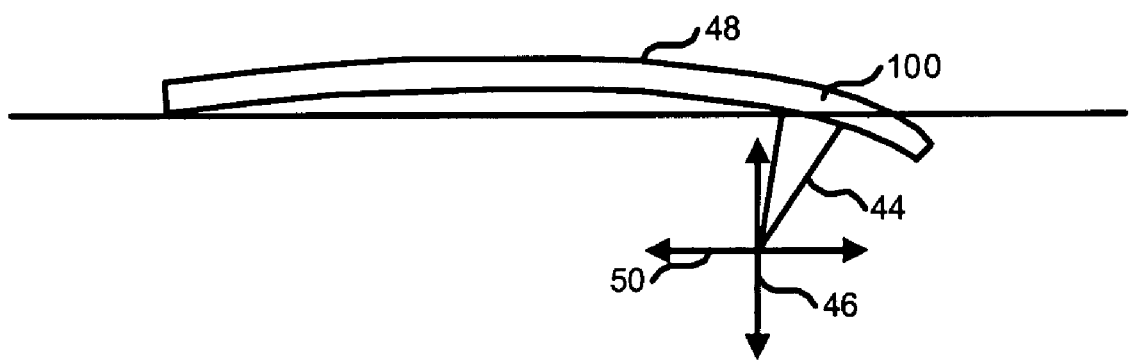
FIG. 11 shows a scanning probe tip located at a node of a mode shape.

The second bending mode generates tip vibrations that are primarily in the $X_{tip}$ direction 50, and depending on the location of the tip 44 also some small tip vibration in the $Z_{tip}$ direction 46. This means that the location of the tip 44 with respect to the mode shape determines the degree of mode coupling. If one locates the tip 44 at a node 100 of the mode shape where there is no $Z_{tip}$ 46 displacement, the tip 44 will rock backward and forward along the $X_{tip}$ 50 axis, as shown in FIG. 11. However, if one locates the tip 44 at the end of the oscillator 48 where the displacement is maximum, the tip 44 would experience rocking in the $X_{tip}$ direction 50 as well as displacement in the $Z_{tip}$ direction 46. In higher order modes it is always possible to find a nodal point 100 that can be used as a strategic point for location of the tip 44 that will decouple one modal displacement from another.

In general, different combinations of distinct resonant modes can be used to produce three mutually orthogonal vibrations of the tip 44. In addition, the modal shapes of any oscillator 48 can be investigated to determine a location of the tip 44 where three mutually orthogonal tip vibrations exist.

Naturally, the scanning strategy needs to take advantage of the direction of displacement of the particular modes to make it sensitive in three distinct directions. For example, for the diving-board shaped oscillator 48 excited in first bending and first torsion, the preferred scanning direction is the $Y_{tip}$ direction 52, laterally with respect to the oscillator 48. Hence, in such an example, a longitudinal scan in the $X_{tip}$ direction 52 would not make the best use of the directions of the two resonant modes selected for force sensing.

For more complicated oscillator shapes, the modes selected for force sensing may be quite different than the ones described in the above illustration.

Figure 12:
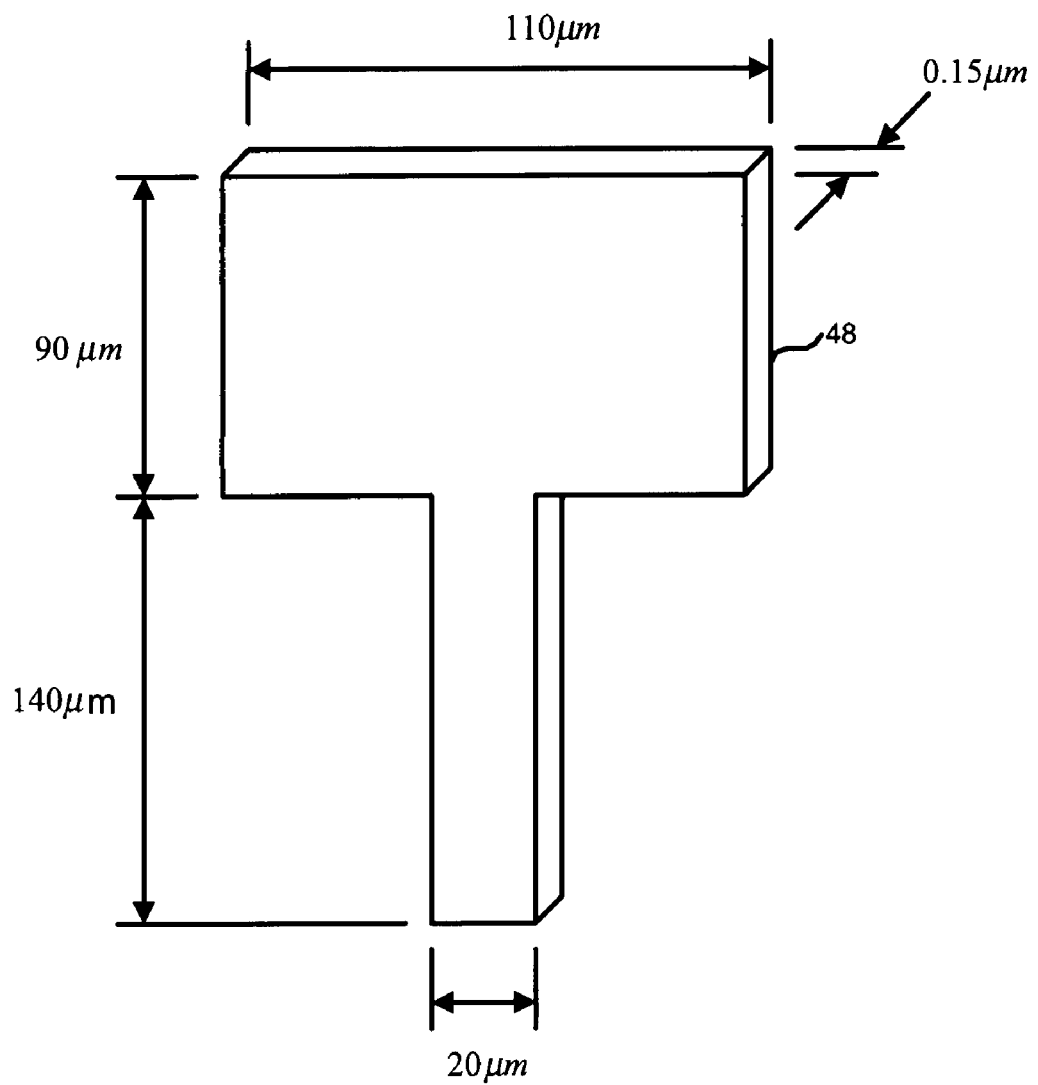
FIG. 12 shows another embodiment of the present innovation that utilizes paddle-shaped oscillator made of single crystal silicon.

Another embodiment of this innovation utilizes an oscillator 48 with the shape, size, and composition provided in FIG. 12. The probe 48 shown in FIG. 12 is an example of a paddle-shaped oscillator 48 made of single crystal silicon. This oscillator 48 can be excited in resonance modes such as bending, lateral bending, and torsion. In a numerical experiment, the resonances of the oscillator 48 were as follows:

| Mode | Frequency (Hz) |
|---|---|
| First bending mode | 1140 |
| First torsional mode | 5509 |
| Second bending mode | 11644 |
| Second torsional mode | 40194 |
| Third bending mode | 55341 |
| Third torsional mode | 69500 |

This is achieved by selecting the shape and the thickness of the oscillator 48. The length-to-width ratio of the oscillator 48 contributes to promoting the bending modes. The paddle shape of the oscillator 48 allows excitation of the torsional modes. The thickness of the oscillator 48 can be used to insure that the lateral bending does not occur before the torsional mode. The relevant resonances are dependent upon the overall dimensions of the oscillator 48 (i.e., its length, width, and thickness). The resonant frequencies are dependent on $\sqrt{k/m}$ where k is the modal stiffness and m is the modal mass. Hence, smaller oscillators 48 having less modal mass have higher resonant frequencies. The oscillator 48 depicted in FIG. 12 may have a thickness, t, of approximately 0.15 microns, a width, w, of the paddle of approximately 110 microns, a length, d, of the paddle of 90 microns, and an arm with a width of 20 microns and a length, l, of 140 microns. These dimensions are used to illustrate one possible embodiment of a paddle-shaped oscillator 48. However, the present invention need not be limited to this specific set of dimensions or shapes. This paddle-shaped design allows the oscillator 48 to have at least three distinct resonant modes.

Figure 13:
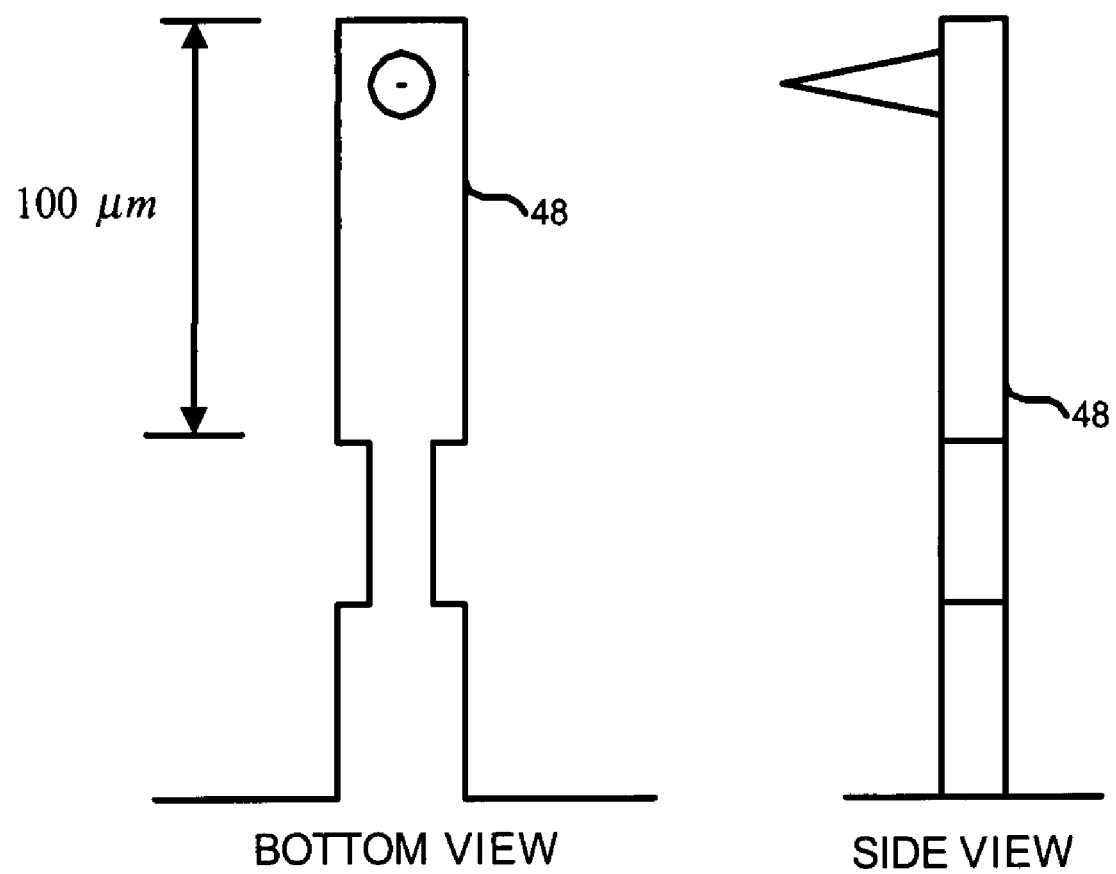
FIG. 13 shows another embodiment of the present innovation that utilizes notched diving-board shaped oscillator.
Figure 14:
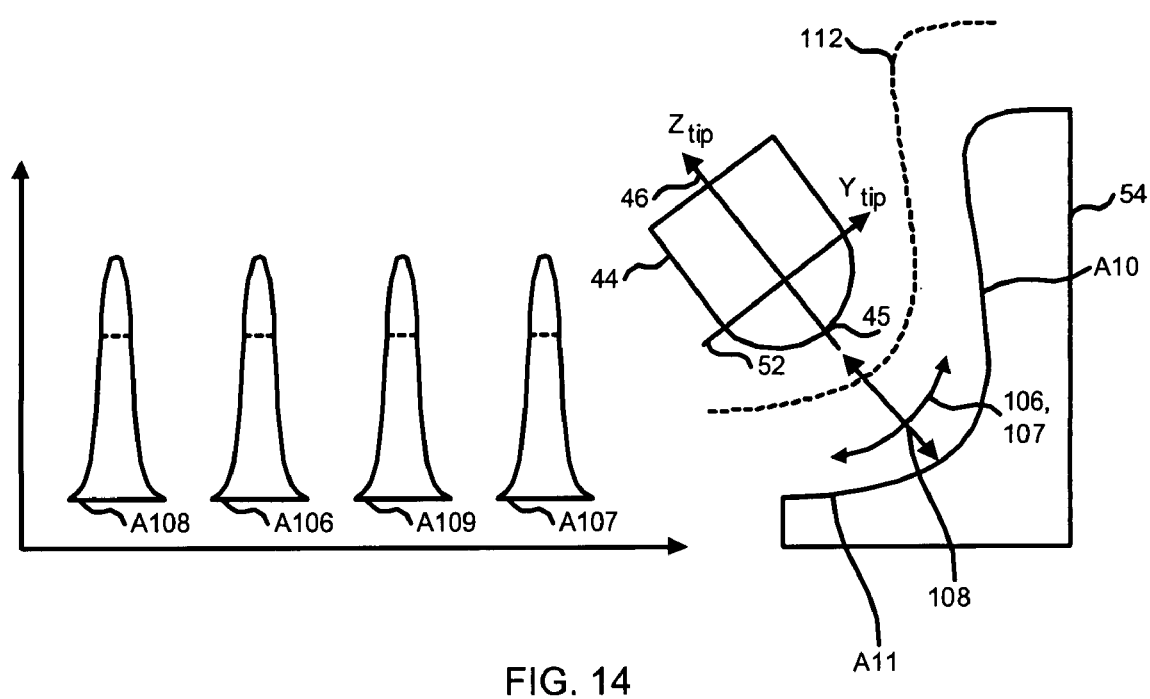
FIGS. 14 and 15 show alterations of multiple resonances in response to tip-surface interactions in multiple directions.

Yet another embodiment of this innovation utilizes an oscillator 48 with the shape, size, and composition provided in FIG. 13, which is a multiresonant oscillator 48 capable of vertical ($Z_{tip}$) 46, lateral ($Y_{tip}$) 52, and longitudinal ($X_{tip}$) 50 imaging.

So that the resonances will have a high Q, the oscillator 48 may be manufactured from a single silicon crystal cantilever 48. Other embodiments may include such materials as silicon nitride or composite layered material. Furthermore, Q is affected by the quality and surface of the oscillator structure 48.

Vibration Sensing System

The function of the vibration sensing system is to transfer the response of the force sensor into information useful for the feedback controller. The feedback controller drives the scanning probe 48 over the sample 54 via a three dimensional actuator system.

The force sensor of this invention can have sensitivity in three orthogonal directions, in contrast to the conventional force sensor that is only sensitive to one direction. An embodiment of the present invention can use an oscillator 48 that utilizes resonant modes such as bending, second bending, lateral bending, and torsion, to accomplish force sensing in multiple mutually orthogonal directions. These higher and more complex resonant modes require a greater bandwidth in the vibration sensing system and capability to monitor multiple resonant vibrations simultaneously. The requirement to monitor oscillator vibrations implies that the signal from the force sensor is an AC signal.

The vibration sensing system needs to be capable of recording the alteration of the multiple resonances under the influence of the surface force interactions.

In the preferred embodiment of this invention, the vibration sensing system is a laser-bounce based sensing system. In this embodiment there is a focused laser beam pointed towards the oscillator 48 at an oscillator location where there is maximum displacement in all of the resonant modes, and a detector that monitors the displacement of the reflected laser beam. The preferred detector of this invention is a continuous position sensitive detector (CPSD). A CPSD is capable of monitoring the position (DC signal) and displacement (AC signal) of the centroid of the reflected light beam on the surface of its aperture. Alternatively, one may use a quadrant position sensitive detector (QPSD), commonly used with conventional scanning prove tools, to detect the position and displacement of the reflected light beam on the surface of its aperture. However, QPSDs typically require a focusing lens to form perfectly circular reflected light beam on the aperture of the QPSD detector.

In another embodiment, other types of vibration sensing system are also applicable, such as, a fiber optic or bulk interferometer, an intensity based sensor, light-polarization based sensor, a piezoelectric sensor, capacitive sensor, a magnetometer based sensor, and electromagnetic radiation based sensors. Any of the sensing systems can be an external or integrated with the oscillator 48. Other types of vibration sensors, as known to those with ordinary skills in the art, may also be utilized.

In the present innovation, there are three methods that can be used for monitoring the alteration of multiple resonances under the influence of the surface force interactions: (1) in the frequency domain, (2) in the spatial domain, and (3) a combination of the other two methods. The frequency domain method is the preferred vibration monitoring method of this invention.

In the frequency domain, a single broadband output signal from the detector can be processed with a spectrum analyzer and divided into as many spectral domains as needed. Each of the spectral domains of interest corresponds to each utilized resonant frequency of the oscillator 48. In the preferred embodiment there are three resonant frequencies of interest. The spectrum analysis can be achieved by notch filtering the detector output signal so as to only allow the frequency of interest to be monitored, by fast-fourier-transformation (FFT) of the detector output signal, and by signal extraction with the help of lock-in amplifiers. Because the modal shape of the oscillator 48 determines the direction of the force sensor sensitivity, each frequency already has the information about the direction of the sensitivity already embedded in it. Therefore, the vibration sensing system does not have the responsibility of determining the directions of sensitivity of the force sensor; it only needs to extract information about each frequency of interest.

In the preferred embodiment, the output of the vibration sensing system includes a vibration amplitude and a phase shift associated with each frequency used for force sensing. A feedback controller can use either an amplitude change or phase shift information, or a combination of both to keep the tip at constant surface force interaction levels in all three directions.

For spatial domain based vibration sensing, each direction of the force sensor sensitivity is associated with a particular spatial displacement of the oscillator 48 or a combination of spatial displacements. In general, spatial displacement of the oscillator 48 may be translational or rotational. The spatial displacements of the oscillator 48 are associated with a direction sensitive detector system that helps transform each direction of the force sensor sensitivity with a unique output that can be used with a feedback controller.

In the preferred laser-bounce based vibration sensing system of this invention, the direction sensitive detector is a continuous position sensitive detector (CPSD) or a system of strategically positioned CPSDs that help in monitoring the reflected laser beam in spatial displacements that can be geometrically transformed into unique outputs. For a valid geometrical transformation it is important that the number of known CPSD spatial displacements be greater than or equal than the number of unknown spatial displacements of the oscillator 48 to be obtained.

Figure 23:
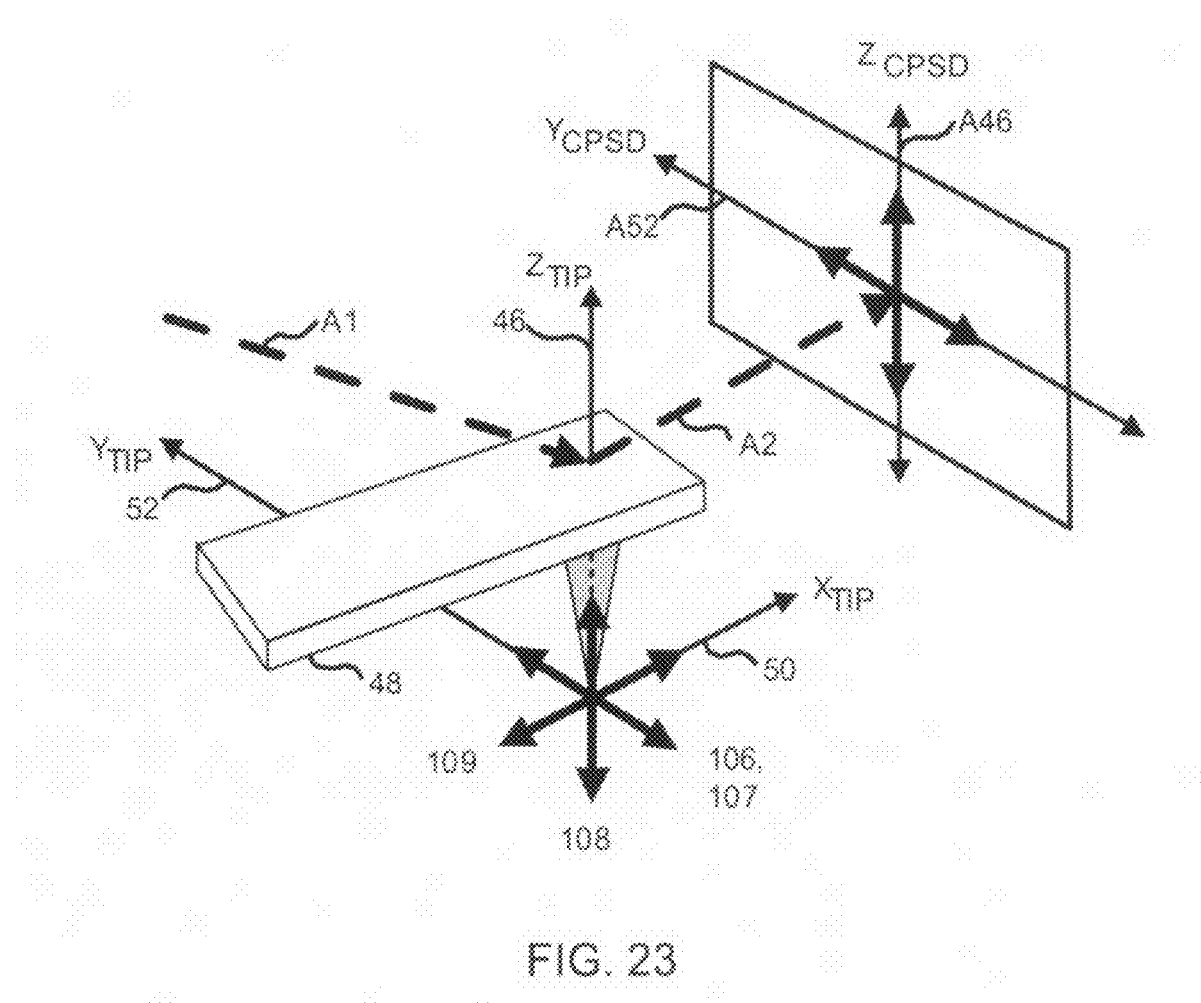
FIG. 23 shows the spatial domain based method of vibration sensing.

FIG. 23 illustrates the spatial domain based method of vibration sensing. In this illustration the $X_{tip}$ axis 50 of the oscillator 48 is perpendicular to the detector aperture ($Y_{cpsd}$ A52-$Z_{cpsd}$ A46), where the $Y_{tip}$ axis 52 of the oscillator 48 is parallel to the $Y_{cpsd}$ axis A52 of the detector, and the $Z_{tip}$ axis 46 of the oscillator 48 is parallel to the $Z_{cpsd}$ axis A46 of the detector.

The incident A1 and reflected A2 laser beams are aligned along the $X_{tip}$ axis where the incident laser beam A1 is pointed towards the free end of the oscillator 48 at an angle and the reflected laser beam A2 is pointing towards the aperture of the detector and away from the oscillator 48. In this configuration, a first bending 108 mode of the oscillator 48 would produce a free-end-of-the-oscillator spatial displacement in the $Z_{tip}$ direction 46 and the reflected laser beam A2 would produce a trace on the detector aperture that extends in the $Z_{cpsd}$ direction A46. A second bending 109 mode of the oscillator 48 would produce free-end-of-the-oscillator spatial displacement mainly in the $X_{tip}$ direction and the reflected laser beam would produce a trace on the detector aperture that also extends in the $Z_{cpsd}$ direction A46. A geometric transformation can be used to decouple the $Z_{cpsd}$ A46 output of the detector to determine the contribution from the first 108 and the second 109 bending modes. A first torsion 106 or first lateral bending 107 mode of the oscillator 48 would produce a free-end-of-the-oscillator spatial displacement mainly in the $Y_{tip}$ direction 52 and the reflected laser beam would produce a trace on the detector aperture that extends in the $Y_{cpsd}$ direction A52. A time domain sampling of the laser trace on the aperture of the detector will produce outputs that are associated with the three resonant modes. A geometrical transformation may be used to produce detector outputs that are uniquely associated with the three resonant modes. Therefore, we have obtained three unique detector outputs associated with three resonant modes of the oscillator 48. Because the modal shape of the oscillator 48 determines the direction of the force sensor sensitivity, we can therefore associate each direction of the force sensor sensitivity with a unique output that can be used with a feedback controller.

The spatial domain based vibration method allows the present invention to take advantage of multi-dimensional sensing systems, such as those disclosed in MANCEVSKI1, that are capable of sensing angular displacements and vibrations as well as linear displacements and vibrations.

The multi-dimensional sensing systems described in MANCEVSKI1 also disclose an oscillator 48 with a fiducial surface, which is a reflective coating at the free end of the oscillator 48 surrounded by a non-reflective surface. When this mirror-on-an-oscillator is illuminated with a collimated light beam with an illumination area that is many times larger than the area of the fiducial surface, we can observe in-plane displacements and vibrations of the oscillator 48. Lateral bending mode 107 qualifies as an in-plane motion. Therefore, the oscillator 48 with fiducial surface disclosed in MANCEVSKI1 is suitable for monitoring the lateral spatial displacement of the oscillator displacements of the tip 44 generated with the lateral bending mode 107.

In the third vibration sensing system method we combine the frequency domain and spatial domain methods to monitor the vibration signals of the resonating oscillator 48.

It is required that all relevant components of the vibration sensing system, such as the continuous position sensitive detector (CPSD), the associated electronics, the data acquisition, and the control system accommodate the frequency bands of the oscillator resonances. The bandwidth of a typical CPSD sensor disclosed in MANCEVSKI1 is in the MHz region. This frequency band is more than sufficient to be used with most commercially available oscillators 48. Currently, commercially available PC based data acquisition and control system, such as one from National Instruments, has a bandwidth of 100 KHz for a single channel. A more advanced data acquisition and control system from National Instruments has a bandwidth of 333 to 500 KHz, depending on the digital bit resolution. Those bandwidths are sufficient for implementation of real-time feedback control. However, the present invention need not be limited to this specific PC-based data acquisition and control system. Any data acquisition and control system known to those skilled in the art may be utilized in other embodiments of the present invention.

In one embodiment of the invention, the output signal from the CPSD is directly digitized with the help of data acquisition hardware. With this approach, the spectral analysis of the signal and the feedback controller may all be done digitally in software. The advantage of this digital approach is its flexibility to handle complex logic operations and sophisticated feedback controllers, and the elimination of expensive analog instruments such as lock-in amplifiers.

In another embodiment of the present invention the laser intensity of the laser-bounce based vibration sensing system may be time varying instead of being constant. In one embodiment, the frequency of the laser intensity variation may coincide with one or more of the resonant frequencies of the oscillator 48. In another embodiment, the frequency of the laser intensity variation may be different than the resonant frequencies of the oscillator 48.

Excitation System

The invention also incorporates an excitation system that is used to excite the oscillator resonances used for force sensing. The excitation system of the preferred embodiment uses a piezoelectric (PZT) disk actuator 102 mounted next to the oscillator base 104 to provide mechanical energy to the oscillator 48. The PZT disk actuator 102 is excited with a signal that is an algebraic sum of signals with frequencies equal or close to the resonant frequencies of the oscillator 48. The excitation signal can excite only the frequencies of interest and not the other resonant frequencies. The excitation signal can be also used as a reference signal for the spectrum analysis of the detector output signal. Other types of oscillator excitation mechanism include electrostatic, magnetic, and thermal.

Feedback Control

In principle, an embodiment of the present invention operates by positioning a resonating oscillator 48 with three resonant modes with respect to a three-dimensional surface 54. Positioning the tip 44 of the oscillator 48 in proximity to the surface 54 alters the excited resonant frequencies of the oscillator 48. The magnitude of the resonance alteration will depend on the actual distance 112 between the tip 44 and the sample 54 and the orientation between the oscillator 48 and the sample 54.

In one embodiment of the present invention the tip-sample distance 112 is controlled by a three-dimensional mechanical actuator. This three-dimensional mechanical actuator moves the tip 44 to a desired distance 112 from the sample surface 54 and in directions consistent with the functioning of the multi-directional force sensor. The tip 44 of the oscillator 48 vibrates with a small amplitude in three perpendicular directions ($X_{tip}$ 50, $Y_{tip}$ 52, $Z_{tip}$ 46). In the proximity to a sample surface 54, when the tip 44 is in the attractive atomic force region, a resonant frequency of the oscillator 48 will decrease, and when the tip 44 crosses into a repulsive atomic force region, the resonant frequency of the oscillator 44 will increase. A feedback loop uses these resonance shifts to keep the tip at a constant surface force interaction level in all three directions.

Several methods can be used to implement the feedback controller. In one method there are three independent PID (proportional-integrated-derivative) controllers, one for each force sensing direction, that operate independently of each other and in a simultaneous manner. These are called three single-input single-output (SISO) controllers. In this method, each controller is not aware of the operation of the other two controllers and any feedback action by the two other controllers will be seen as a disturbance to the third controller. This method works the best when all three resonances are uncoupled and independent. After the feedback controllers produce an output, it is possible to transform the three outputs into another three outputs to satisfy the coordinate system of the actuator.

In a variation of the SISO controller, each PID controller may be employed one at a time, where some switching logic is implemented to switch from one controller to another. The switching logic needs to be able to determine when the surface 54 changes direction (e.g., an incoming vertical wall A10 after a flat horizontal surface A11). To satisfy this requirement, one of the resonances that does not participate in the active controlling (for example resonance A106 that corresponds to mode 106) may be used as a monitor of an incoming surface A10 in the direction in which it is primarily sensitive. After the tip 44 reaches a certain critical point, the PID controllers will be commanded to switch. After such a switch, a resonance that was used for monitoring (for example resonance A108 that corresponds to mode 108) becomes the primary controlling instrument and the former controlling resonance A106 becomes a monitoring resonance.

In another method, there are three dependent PID controllers, one for each force sensing direction, that operate coupled with each other and in a simultaneous manner. This implementation uses one multiple-input multiple-output (MIMO) controller. In this method, the column vector of the three inputs from the vibration sensing system is multiplied by a matrix of input-output co-dependencies to produce the actuator output column vector. The matrix represents the cross coupling between the surface force interactions and the resonance alterations associated with the three resonant modes A108, A106, and A109. If there is no cross coupling then the respective off-diagonal matrix elements are zero. For a fully decoupled system the matrix is a diagonal matrix. The coefficients of the matrix may be determined by modeling the force sensor or may be obtained experimentally. For example, one could experimentally observe alterations in resonant frequencies as the oscillator 48 is displaced towards a surface 54 in the X Y and Z directions, respectively.

In a variation of the MIMO controller, there may be more than three inputs, each associated with an oscillator resonance. Utilizing more than three resonances can improve the confidence level associated with the force sensing. Each of the extra resonances needs to be sensitive to the resultant of the surface force interaction in a particular direction. If an extra resonance is sensitive in more than one direction, the contribution of each surface force interaction of a particular direction to that resonance needs to be known. For example, a second bending mode 109 of a preferred oscillator 48 is mainly sensitive to the resultant surface force interaction in the $X_{tip}$ direction 50 and is somewhat sensitive to the resultant surface force interaction in the $Z_{tip}$ direction 46. The outputs of this MIMO controller are three actuator signals proportional to the three perpendicular force sensing directions, where each controller output is a result of the contribution of many resonances.

In a variation of the above MIMO controller, a neural network may be employed to automatically weight the contribution of each surface force interaction of a particular direction to each resonance monitored. Neural networks can increase the confidence associated with the force sensing.

Figure 15:
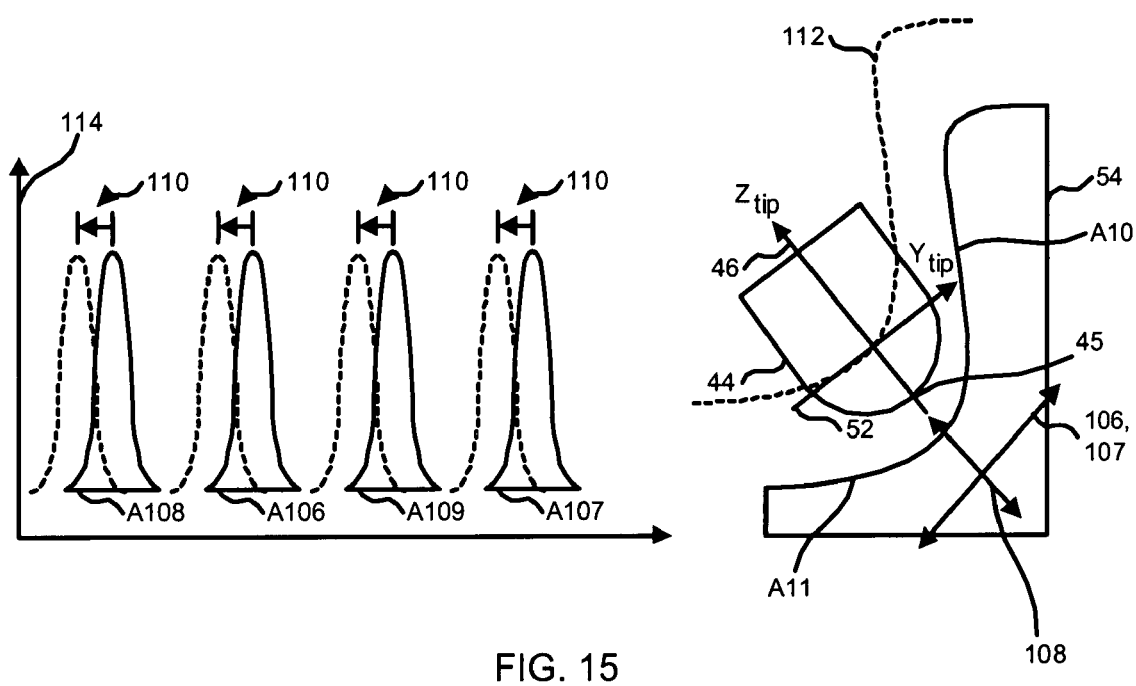

A controller, using any of several different types of control logic, can be used to command actuators to move either the tip 44 or the sample 54 relative to each other in response to sensed alterations in the natural frequencies of multiple resonances, as shown in FIG. 15. $X_{tip}$ 50 and global X axis point out of the paper of FIG. 15 at the reader. Therefore, the YZ plane is the parallel with the surface of the paper of FIG. 15. One such type of control logic is to maintain either the amplitudes 114 or the frequency differences 110 (expressed through phase differences) of the respective resonances at fixed predetermined set-point values, in all three directions. Each direction may have a different set-point. Alternatively, the control logic may include an algorithm for adjusting the amplitude 114 or phase-shift 110 set points associated with the respective resonances during the scan. The amplitude 114 or phase-shift 110 set points can be adjusted either continuously or in discrete steps during the scan. Adjustments of the amplitude 114 or phase-shift 110 set points can be based on an empirically determined control law. Alternatively, adjustments of the amplitude 114 or phase-shift 110 set points can be determined adaptively so as to cause the apex 45 of the tip 44 to move substantially parallel to the sample surface 54 during the scan. Such adaptive adjustments of the amplitude 114 or phase-shift 110 set points require determination and use of a force calibration curve for each of the respective modal resonances used for force sensing. Such force calibration curves relate either the amplitude 114 or phase shift 110 of the respective resonance to the tip-surface distance 112.

Improved Scan Control

Figure 3A:
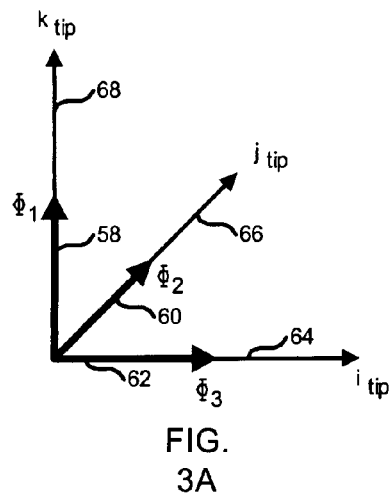
FIG. 3A shows typical orientations of three selected mode shape vectors, evaluated at spatial coordinates corresponding to the apex of a probe tip.
Figure 3C:
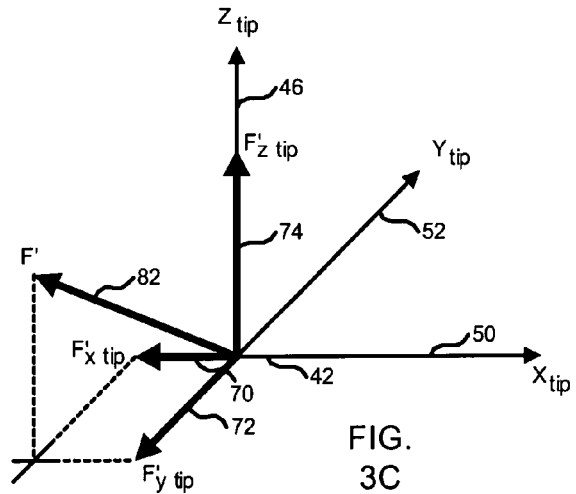
FIG. 3C shows a vector which is the sum of three surface force interaction vectors.
Figure 3B:
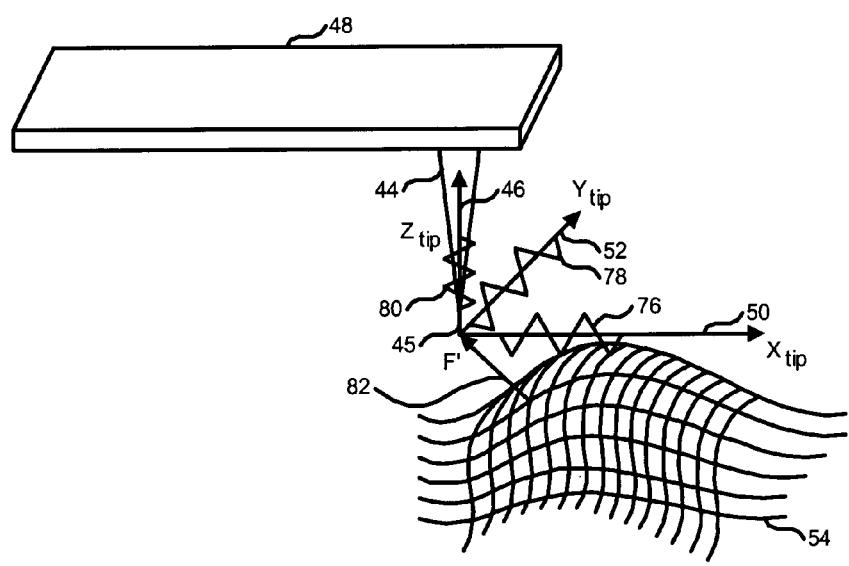
FIG. 3B shows the resultant surface force interaction vectors modeled by the three virtual springs with variable spring constants that are functions of the tip-surface distance.
Figure 4A:
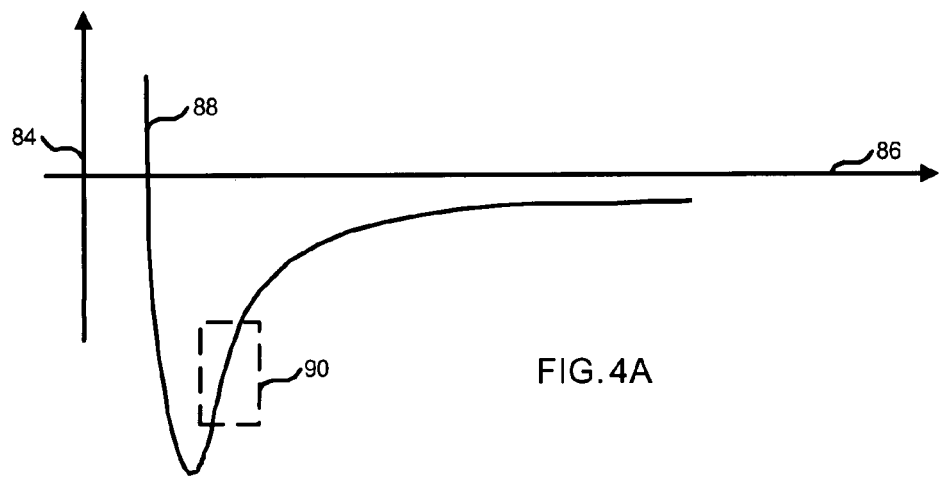
FIGS. 4A and 4B show the resultant surface force as a non-linear function with respect to the tip-surface distance.
Figure 4B:
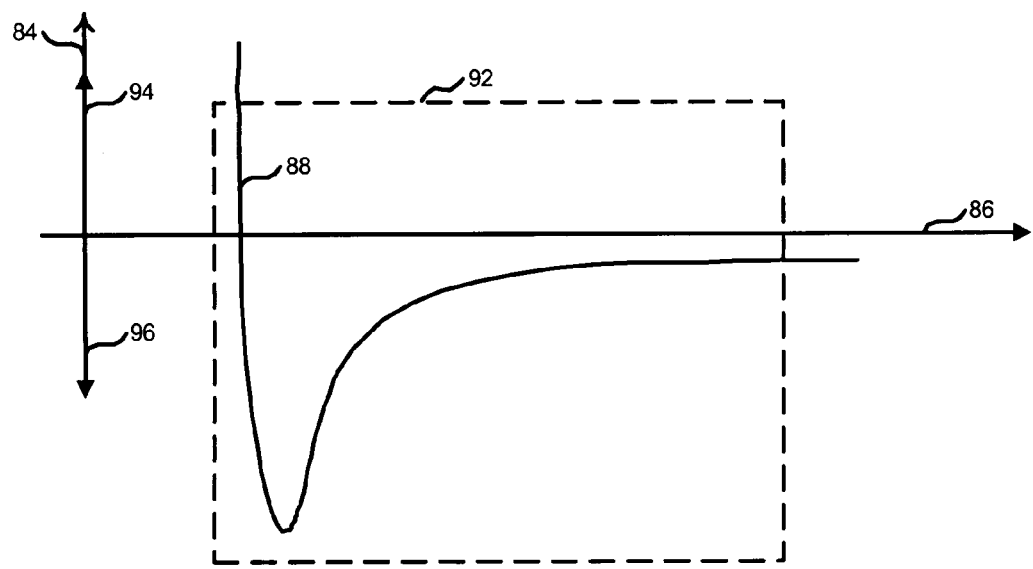
Figure 5A:
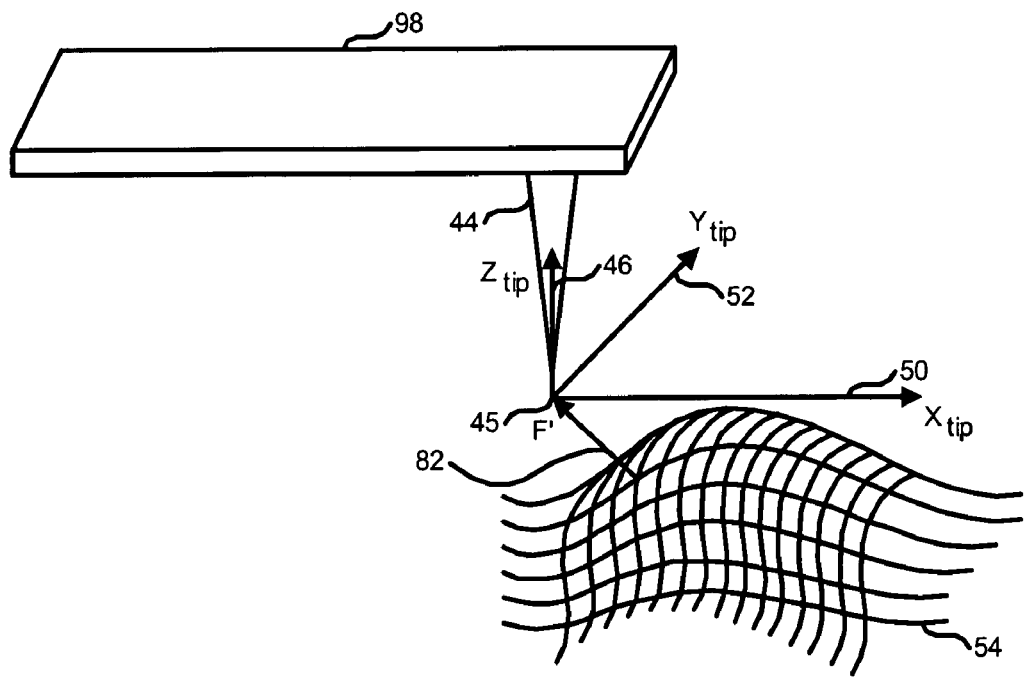
FIGS. 5A and 5B show that in conventional scanning probe microscopy (SPM), the force sensor is only sensitive to the resultant of the surface force interaction in the direction ($Z_{tip}$) along the length of the tip.
Figure 5B:
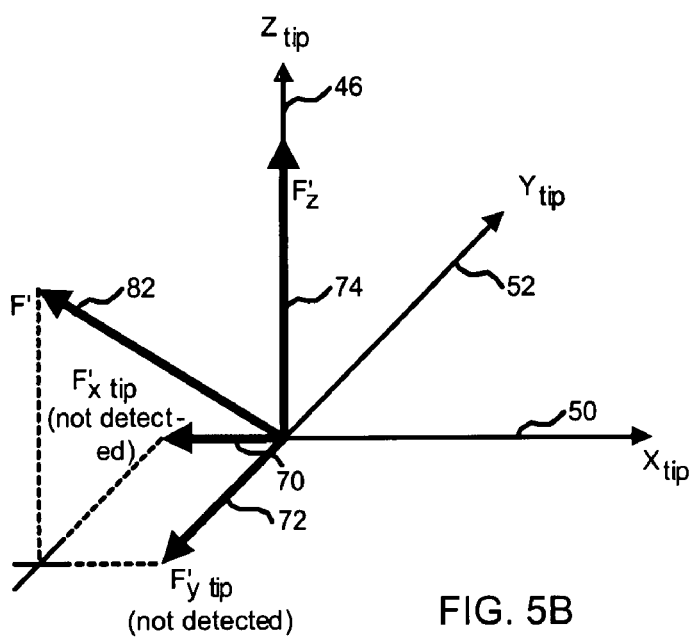
Figure 6:
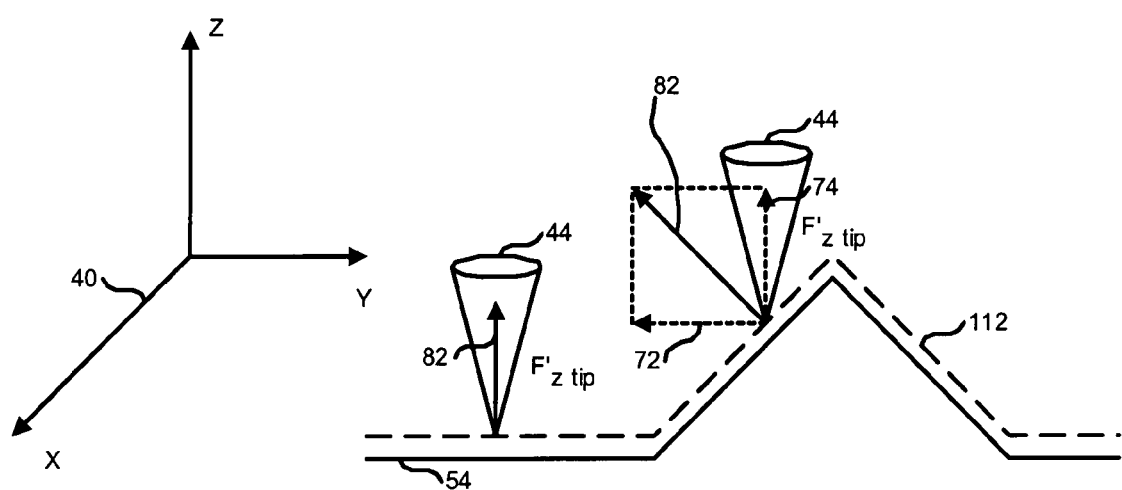
FIG. 6 shows scale error that occurs when a tip of a conventional SPM that is oriented in the Z direction scans over a sloped surface.
Figure 7A:
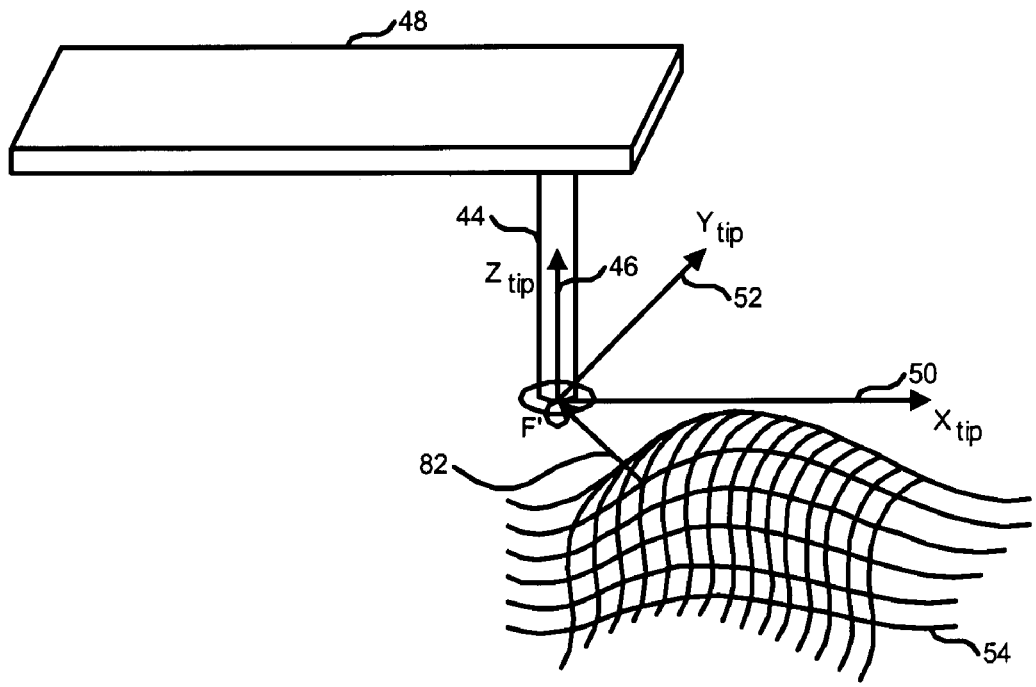
FIG. 7 shows a prior art embodiment having a cantilever that resonates in the $Z_{tip}$ direction and dithers (a non-resonant vibration) in the $Y_{tip}$ direction.
Figure 7B:
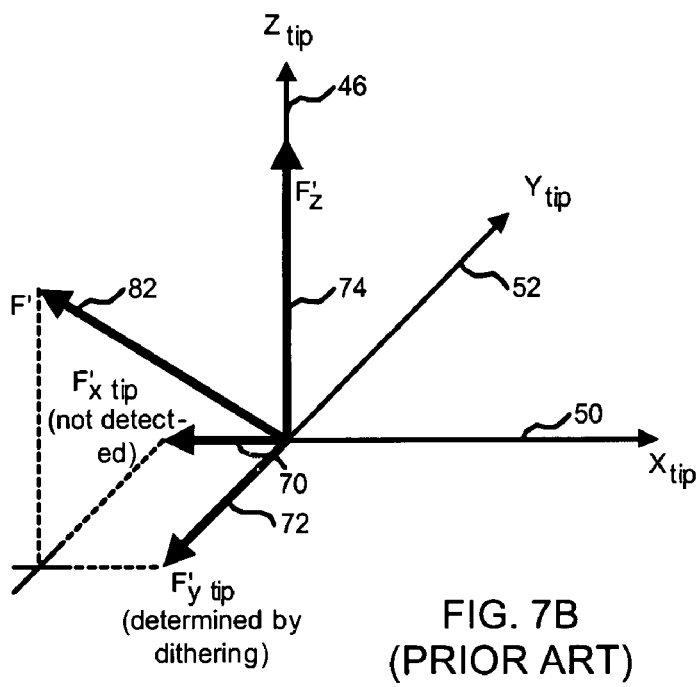
Figure 8:
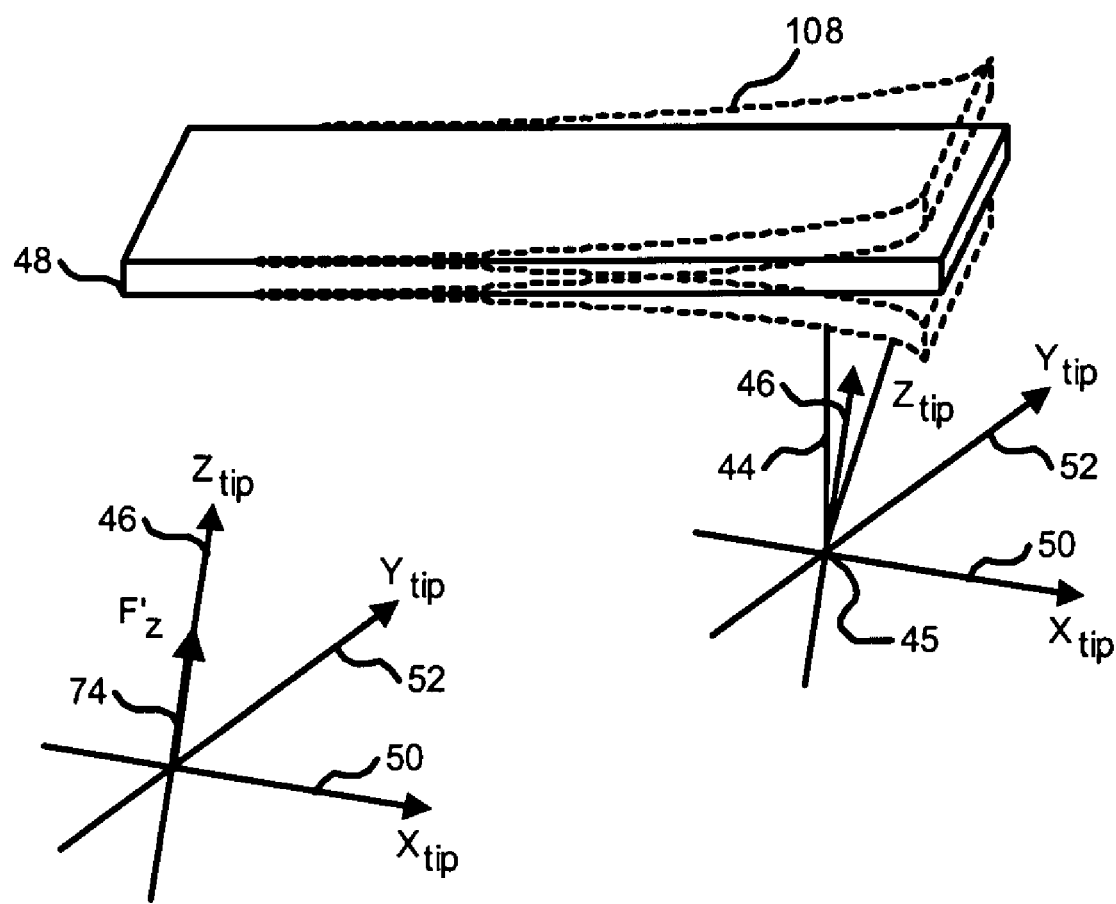
FIG. 8 shows the first bending mode which generates tip vibration in the direction along the length of the tip.

In one embodiment, the force sensor can be used to provide additional information useful for improved scan control by building a near real-time estimate of the three-dimensional orientation of the region of the sample surface momentarily in proximity to the tip 44. This method requires determination and use of a force calibration curve for each of the respective modal oscillations used for force sensing. Such force calibration curves relate either the amplitude 114 or phase shift 110 of the respective oscillation to the tip-surface distance 112. Surface force interaction vectors along the respective local coordinate axes 42 can be determined once such calibration curves are known. The estimated orientation of a sample surface region in proximity to the tip 44 is estimated as normal with respect to the vector F' 82 shown in FIGS. 3B and 3C (i.e., the sum of the three surface force interaction vectors). This normal assumption is valid for the special case of an infinite homogenous plane sample surface. Other variations of the control logic can be used to take into account the integrated effects associated with a finite, non-planar sample surface 54. To accomplish improved scan control, the apex 45 of the tip 44 is commanded to move substantially parallel to the estimated sample surface 54 during the scan. This method helps prevent crashing the tip 44 when an abrupt increase of surface 54 slope is encountered (e.g., encountering a vertical wall). This method also helps prevent the tip surface distance 112 from increasing too much when an abrupt decrease in surface 54 slope is encountered (e.g., encountering the edge of a feature).

In another embodiment, an improved estimate of sample 54 topography can be obtained by post processing the data recorded during a previous scan. Approximate sample topography obtained from the first scan is used to estimate the vector field F' 82 representing the surface force interactions in the region near the sample surface 54 traversed by the tip 44 during the scan. The scan data is then reprocessed using this new estimate of the vector field F'82, resulting in improved estimate of the sample 54 topography. The post processing procedure can be repeated multiple times until differences in estimated surface 54 topography are arbitrarily small. This method allows integrated effects from the surface 54 on the tip 44 to be taken into account. Integrated effects are the cumulative effect of forces from a relevant volume of the sample 54 acting on the tip 44.

Other logic systems may be employed to gather data. For example, one could record a historical surface interaction field F' 82 based on an SPM tip 44 positioned by the XYZ stage. By retracing the prior motion of SPM tip 44, one can compare the present surface 54 interaction field to a historical profile. This can be done to verify the repeatability and reliability of scans generated using the present invention. Furthermore, such verifications can be done to provide a quality assurance check on surfaces 54 requiring specific profiles. Another embodiment may use this type of comparison to detect changes or flaws of the surface 54.

In yet another embodiment, repeated sampling of a known sample 54 allows the accuracy of the present invention to be improved by tracking the repeatability of the system on a known sample 54. By sampling a known surface 54, a new SPM tip 44 can be calibrated by developing a correction factor or matrix that matches the obtained result to the expected result.

Figure 24:
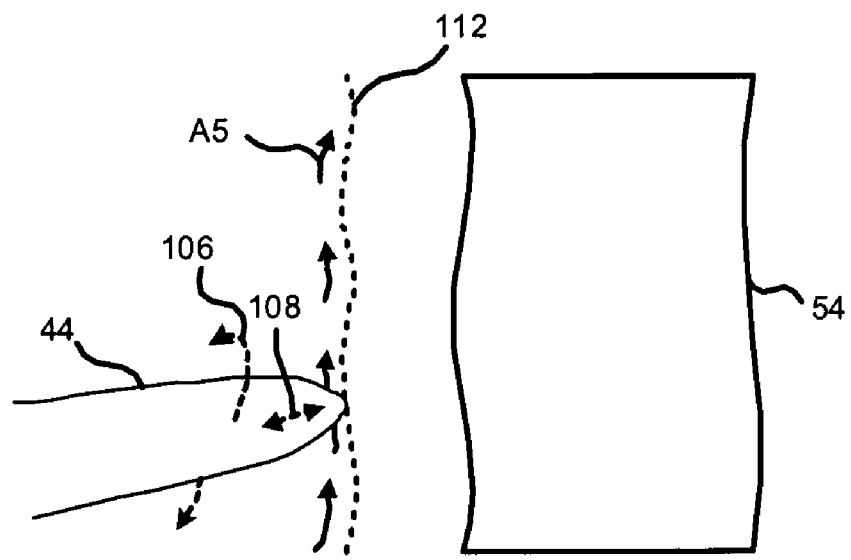
FIG. 24 shows an embodiment of the present invention where the tip scans longitudinally along features instead of laterally with respect to such features.
Figure 24:
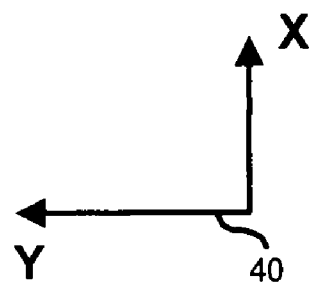

In still another embodiment of the present invention, shown in FIG. 24, the tip 44 can be made to scan longitudinally A5 along narrow features such as metal interconnect lines or resist lines 54 used on the manufacture of semiconductors, instead of laterally with respect to such features. The ability of the present invention to sense a component of the tip-sample interaction force vector 82 in the X direction enables such a longitudinal scan. Advantages of scanning such features longitudinally include improved scanning speed and improved ability to measure sidewall roughness.

Tilted Probe

Figure 16:
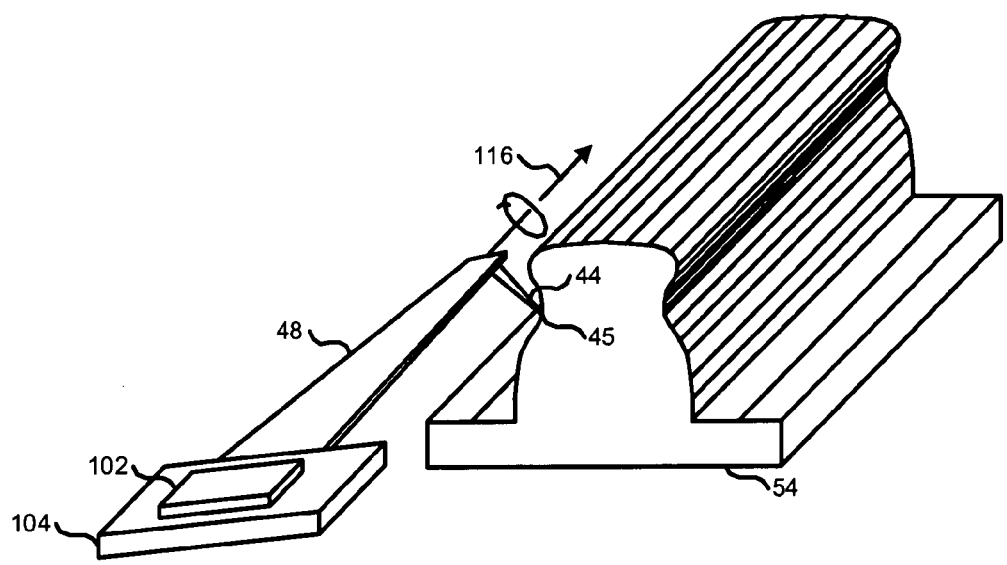
FIG. 16 shows an embodiment of the present invention where the oscillator is tilted around the long axis of the oscillator to provide access to a feature with reentrant sidewall.
Figure 17:
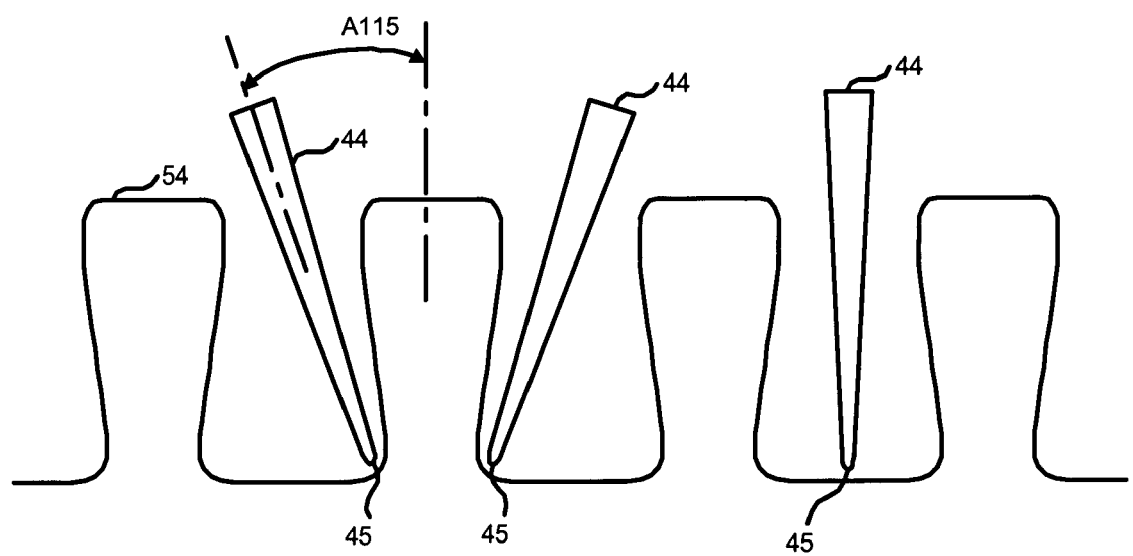
FIG. 17 shows a SPM tip reaching vertical and reentrant sidewall surfaces of a sample with periodic dense high-aspect-ratio features.
Figure 18:
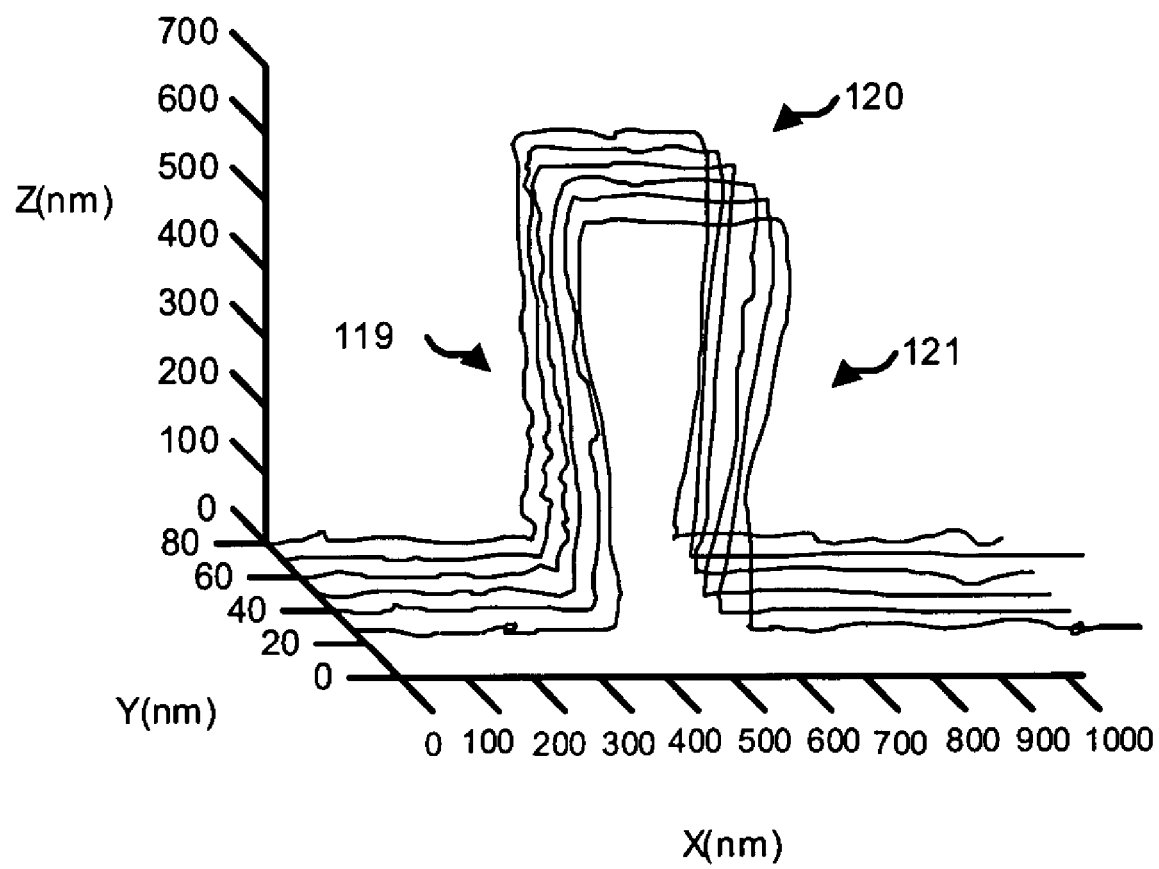
FIG. 18 shows an experimentally obtained scan of a line in a semiconductor integrated circuit with the tilted probe system.

In a preferred embodiment of the invention, the oscillator 48 can be tilted around the long axis 116 of the oscillator 48, as shown in FIG. 16. Preferably, the oscillator 48 tilt angle A115 is larger than the half-cone angle of the tip 44 as to allow the apex 45 of the tip 44 to reach vertical and reentrant sidewall surfaces on the sample 54, as illustrated in FIG. 17. The maximum tilt angle A115 is limited by the width of the oscillator 48 at its free end and the spacing of two sidewall surfaces 54 between which the tip 44 may need to be inserted. For the present invention the typical tilt angle A115 is between 6 and 20 degrees, but is not limited to this range. In this embodiment, the preferred scan direction is in the Y direction, or laterally with respect to the oscillator 48. For such a tilted probe, the vertical tip-sample force vector 82 associated with a horizontal sample surface A11 will couple to both the bending 108 and torsional 106 modes of the oscillator 48, as shown in FIG. 15. Additionally, a horizontal tip-sample force vector 82 associated with a vertical sample surface A10, will also couple to both the bending 108 and torsional 106 modes of the oscillator, as shown in FIG. 15. Therefore, there will be two surface force components that can be detected by the tilted resonating oscillator 48 in all of its possible angular orientations. Their magnitude will depend on the orientation of the probe tip 44 with respect to the surface 54. An experimentally obtained scan of a line in a semiconductor integrated circuit with the tilted probe system is represented in FIG. 18. In this scan, the tip 44 was first tilted in one direction, and afterwards in the other. The image 120 is a patch of the images obtained in the left and right scans.

Carbon Nanotube Tips

Advanced semiconductor integrated circuit features with high aspect ratios are hard to inspect with conventional scanning probe tools that cannot reach vertical, near vertical, or inverted sidewalls A120. This problem is well known to those of ordinary skills in the art. Using an embodiment of the present invention with a tilted probe addresses this problem.

Another problem with conventional scanning probe tools is that conventional silicon tips 44 have a hard time accessing the bottoms of high aspect ratio trenches of advanced semiconductor integrated circuit features. This problem is well known to those of ordinary skill in the art. Conventional silicon tips 44 typically have a half-cone angle of 20 to 30 degrees and are often an integral part of the silicon oscillator 48 structure. An embodiment of the present invention with a tilted probe also has to deal with the feature access problem.

Therefore, to measure line-widths and trench-widths with high aspect ratios encountered with advanced semiconductor integrated circuit features, it is desirable to have a very sharp tip 44 that can reach within the trench bottom and along vertical or reentrant sidewalls A120.

The left sidewall 119 has an angle of 85.8° (57 nm undercut). The right sidewall 121 has an angle of 88.5° (20 nm undercut).

Figure 19:
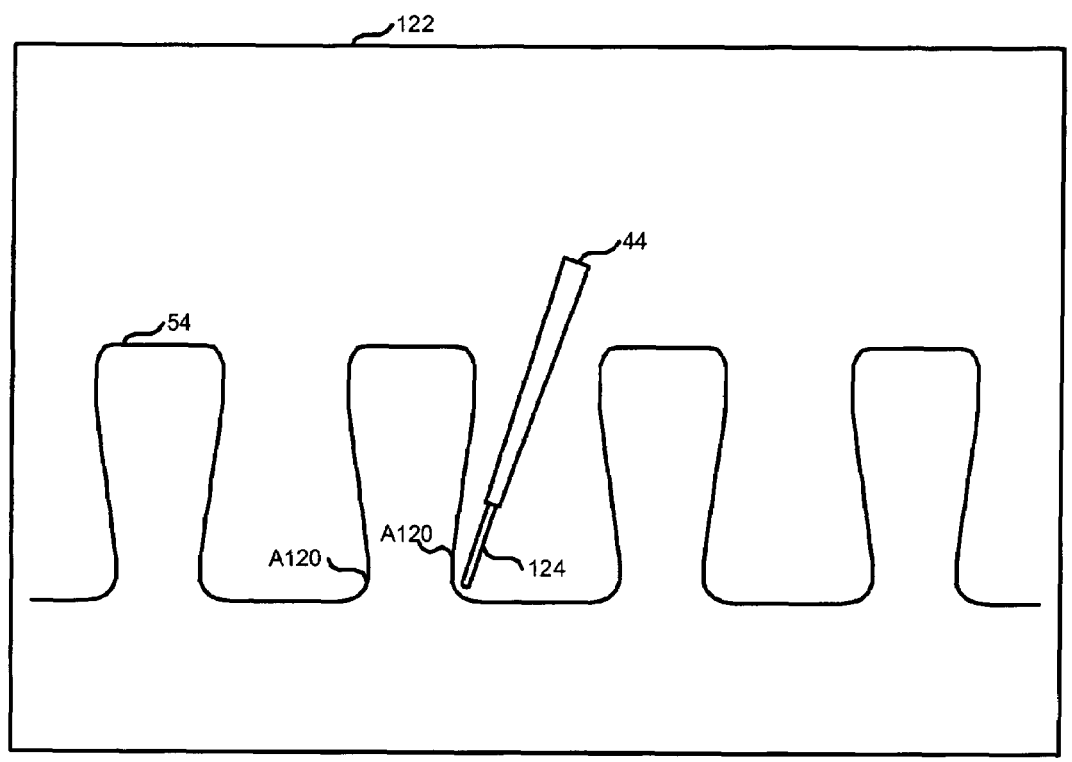
FIG. 19 shows an embodiment of the present invention in which standard oscillator tip is extended with an aligned nanotube tip grown from the apex of the sharp tip using the method of MANCEVSKI2.

In an embodiment of the present invention, the standard oscillator tip 44 is extended with an aligned nanotube tip 124 grown from the apex of the sharp SPM tip 44 using one of the methods described in MANCEVSKI2, as shown in FIG. 19. Preferably, the nanotube 124 is carbon. It is desirable to have a very sharp tip 44 as a support structure on which a carbon nanotube tip extension 124 is grown. Preferably, the sharp tip 44 has a half-cone angle of 3 to 6 degrees.

Figure 20:
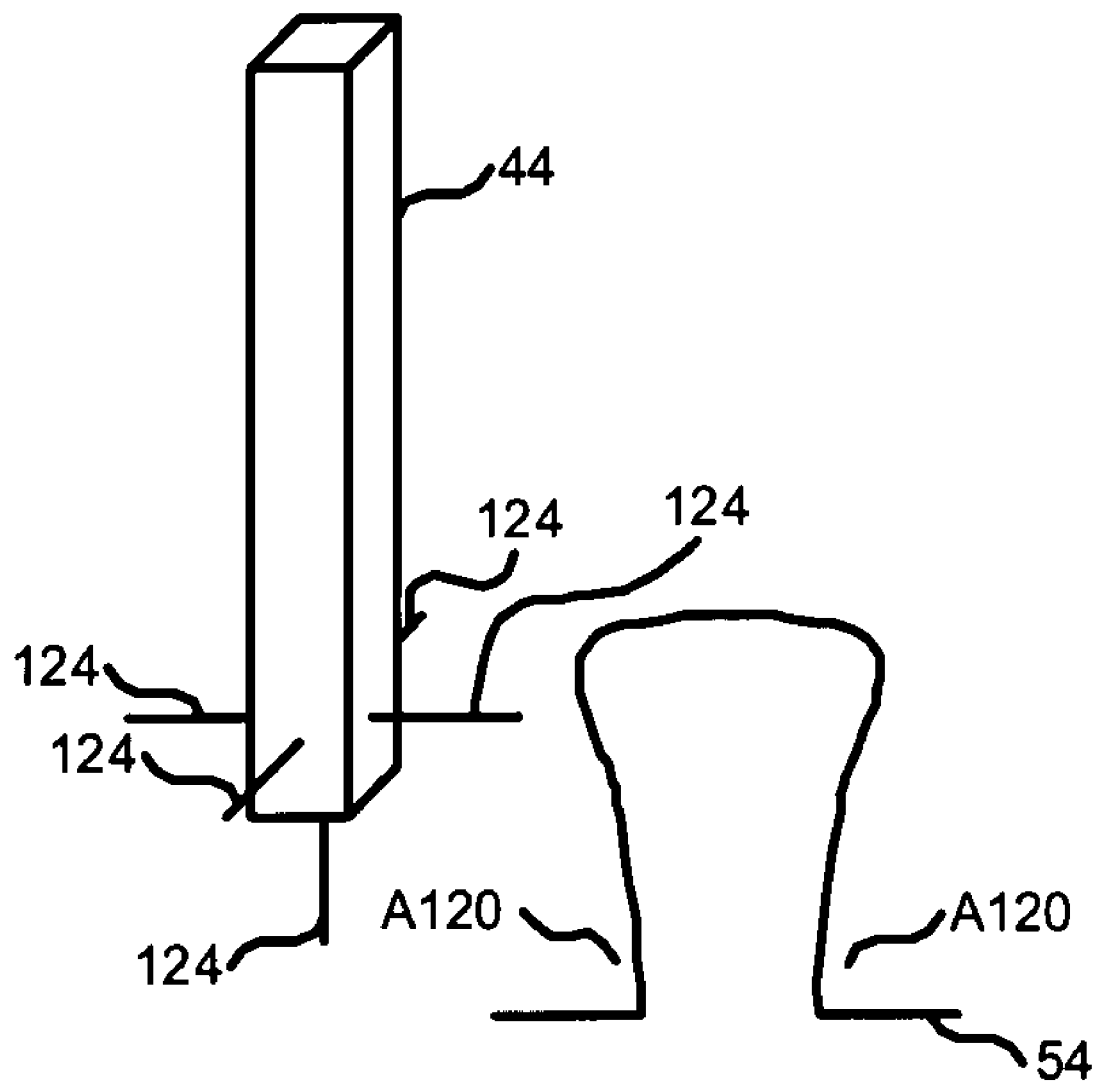
FIG. 20 shows an embodiment of the present invention with a support structure on which carbon nanotube tip extensions are oriented in lateral and vertical directions as to enable imaging of vertical and near vertical sidewalls and trench bottoms; carbon nanotube tip extensions may also function as nanotube oscillators.

In another embodiment of the present invention, the support structure on which a carbon nanotube tip extension 124 is grown is a column structure, as depicted in FIG. 20. The column support structure 44 is attached to an oscillator 48 or cantilever 48 as a SPM tip 44 and may be an integral part of the probe structure. The present invention is not limited to this type of support structure 44. A nanotube tip extension 124 or multiple nanotube tip extensions 124 can be grown from the support 44. Nanotubes 124 can be grown in accordance with the teaching of MANCEVSKI2. Carbon nanotube tip extensions 124 that are simply attached or glued are less rigid, less stable, and provide less control over the position and orientation of the carbon nanotube tip extension 124, than ones that are grown in place using one of the methods described in MACEVSKI2.

A nanotube 124 or multiple nanotubes 124 may be oriented in any direction relative to the structure 44. As an example, FIG. 20 illustrates nanotubes 124 oriented in lateral and vertical directions, which enable enhanced imaging of vertical and near vertical sidewalls A120 and trench bottoms with a same nanotube tip extension 124. The five nanotube tip extensions 124 shown in FIG. 20 are each perpendicular to one another. Hence, two nanotube tip extensions 124 extend along the $X_{tip}$ axis 50, two nanotube tip extensions 124 extend along the $Y_{tip}$ axis 52, and one 124 extends along the $Z_{tip}$ axis 46.

Carbon Nanotube Oscillators

Figure 21:
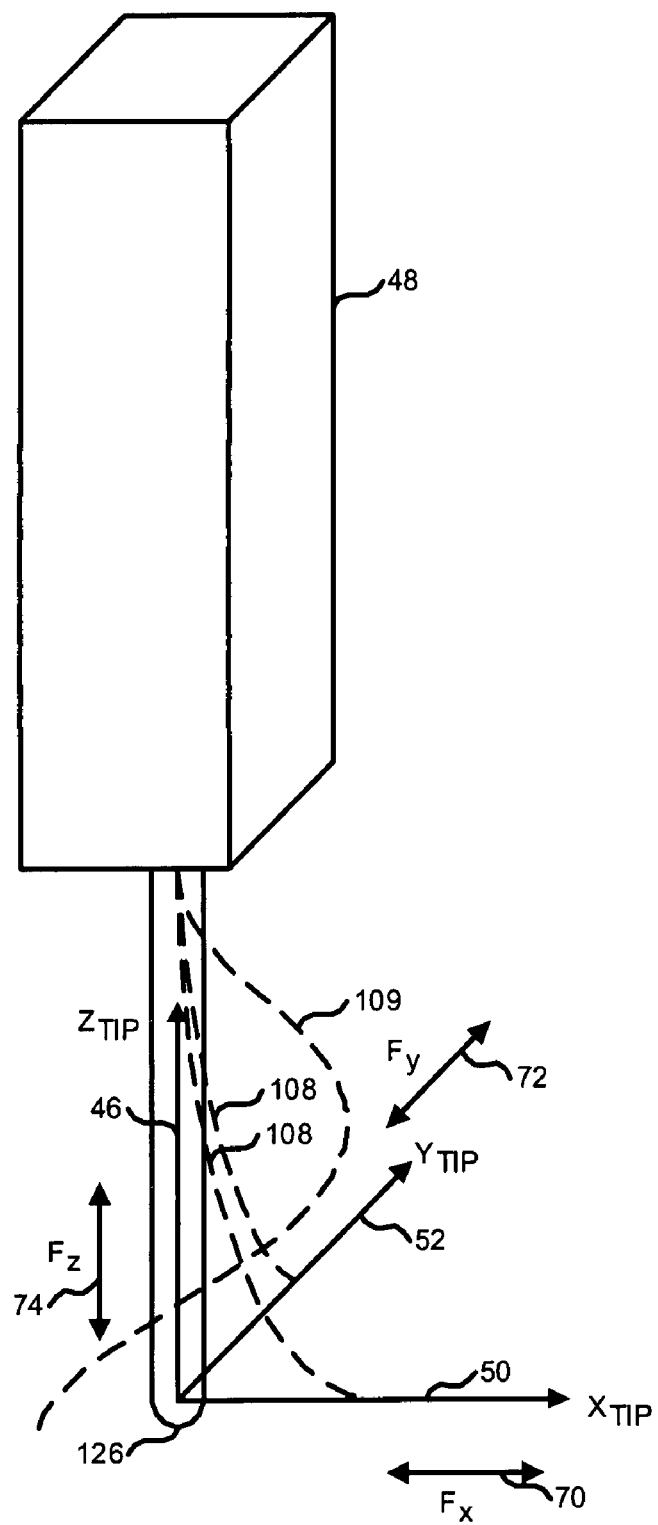
FIG. 21 shows three possible resonant modes of a carbon nanotube oscillator.

In yet another embodiment of the present invention, the tip 44 is no longer a static rigid body that is used to transmit a tip-sample force interaction 82 to the elastic body of the oscillator 48, but it 44 participates in the dynamics of the force sensing. In this embodiment, the tip 44 is also an elastic body that is capable of oscillating in one or more resonant modes, as shown in FIG. 21. Preferably, the elastic tip 44 is a nanotube 126, or more specifically a carbon nanotube 126. We will refer to such an elastic nanotube tip 126 as a "nanotube oscillator" 126. Hence, the function of a nanotube oscillator 126 is to serve as a force sensor. Preferably, a nanotube oscillator 126 is made from or at least comprises carbon.

Multiple resonant modes of a nanotube oscillator 126 can be used to provide sensitivity in at least one and preferably all three directions ($X_{tip}$ 50, $Y_{tip}$ 52, $Z_{tip}$ 46) of the tip-sample force interaction 82. The nanotube oscillator force sensor embodiment of the present invention is consistent with all the capabilities and functions of the oscillator force sensor embodiment of our invention, and all discussions of the oscillator force sensor (characteristics, control, sensing, use, etc.) apply to the nanotube oscillator force sensor.

In a preferred nanotube oscillator force sensor embodiment of the present invention there is a column support structure 48 vertically oriented with respect to the global coordinate system 40 of the sample. Another type of support structure 48 for the nanotube oscillator may be a rigid sharp tip 44. In the preferred embodiment there is a single carbon nanotube 126 oriented vertically, as shown in FIG. 21. One resonance of interest is the second bending mode 109 that will produce end-of-nanotube vibration that is vertical and therefore sensitive to the vertical Z component 74 of the surface force vector 82. This resonant mode may have a projection in the XY plane that is in any direction. However, this is not relevant because the distal end of the nanotube oscillator 126 will move up and down in the vertical direction (Z) irrespective of the orientation of this mode.

Figure 22:
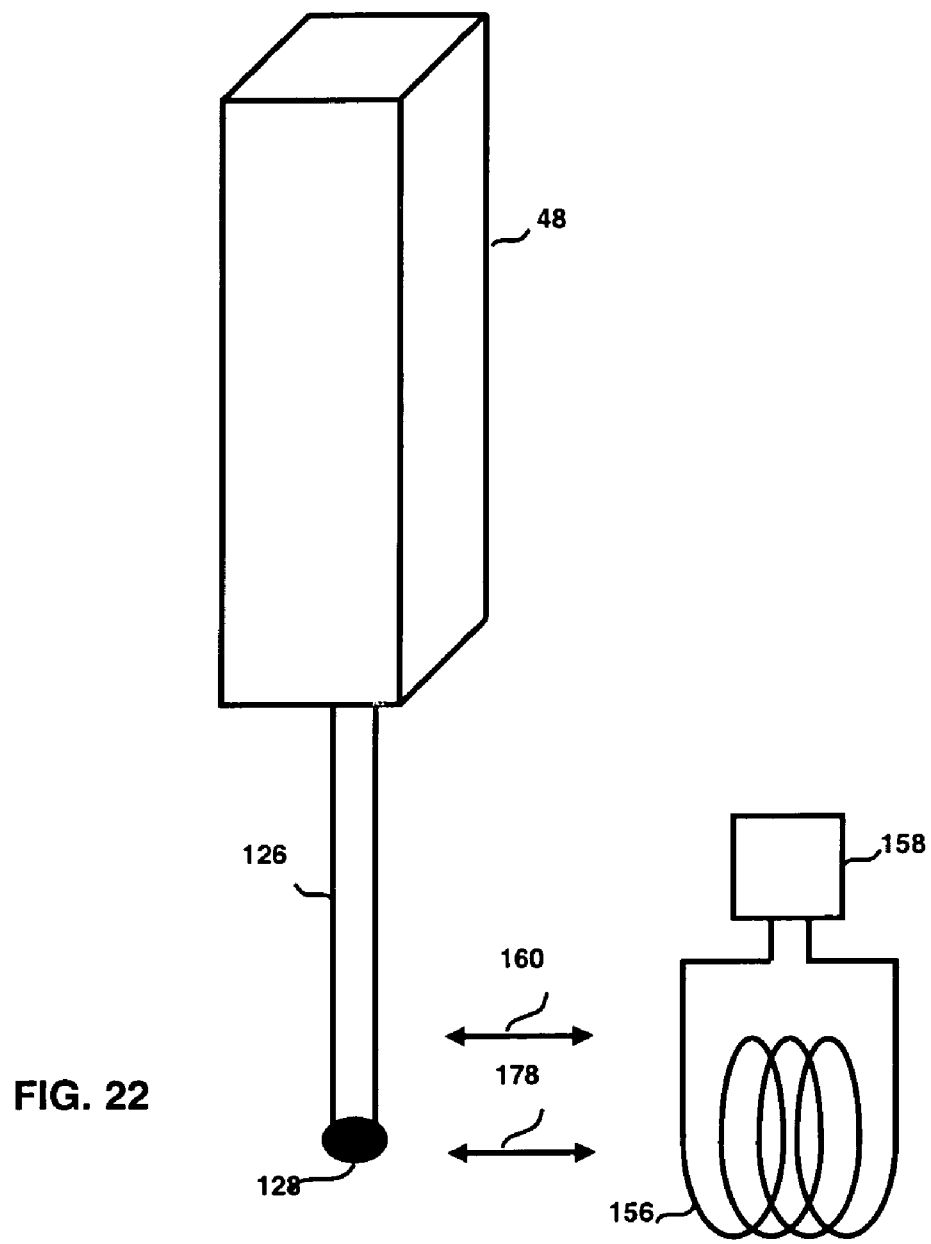
FIG. 22 shows a magnetic particle attached at the end of the nanotube so as to destroy the symmetry and produce distinct resonances with separated modes; the magnetic particle may also be used to magnetically excite the nanotube oscillator.

Another resonance that can be used for force sensing is the first bending mode 108 of the nanotube oscillator 126. Because the nanotube 126 is a molecularly perfect cylindrical structure, there will be two first bending modes that have identical frequencies but produce end-of-nanotube vibrations that are normal to each other. Depending on the phase of the two bending resonant frequencies the end-of-nanotube vibration may be a diagonal or circular motion. Those two resonances are sensitive to the X and Y directions of the surface force interaction 82, respectively. Although the resonant frequencies of the two modes are the same, they can be separated by their phase and therefore made useful for a feedback control, i.e., sensitive to the X and Y directions of the surface force interaction 82. In one of the embodiments of this invention, the phase of the two identical frequencies is influenced to be different by controlling the initial condition of the excitation. In another embodiment of this invention, a magnetic particle 128 is attached at the end of the nanotube 126 to destroy the symmetry and produce distinguishing resonances with separated modes, as shown in FIG. 22. The magnetic particle 128 may also be used to magnetically excite the nanotube oscillator 126. In another embodiment of this invention (not shown) the grown nanotube has a shape that is not symmetrical to produce distinguishing resonances with separated modes.

Means of exciting a nanotube oscillator 126 include (but are not limited to):
1) magnetic coupling 178 to a magnetic particle 128 attached at the distal end of the nanotube oscillator 126,
2) coupling of electromagnetic radiation energy 160 to the nanotube oscillator 126,
3) electrostatic coupling to a charged particle attached at the distal end of the nanotube oscillator 126,
4) thermal gradient near the nanotube oscillator 126,
5) piezoelectric element 102 coupled to the support structure 48 or the support structure 48 may be a piezoelectric element 102, or
6) combination of any of the above means of excitation.

Means of detecting the vibrations of a nanotube oscillator 126 include (but are not limited to):
1) magnetic coupling 178 to a magnetic particle 128 attached at the distal end of the nanotube oscillator 126,
2) current readout from the nanotube oscillator 126 that has been exposed to electromagnetic radiation 160 or a stress,
3) inductive pick-up coil 156 and corresponding tank circuit 158,
4) capacitive readout element positioned next to the nanotube oscillator 126 having a charged particle attached at its distal end,
5) an optical beam illumination and detection of its scattering, or
6) combination of any of the above means of detection.

In another embodiment of the nanotube oscillator force sensor embodiment of the present invention, there is a column support structure 48 vertically oriented with respect to the global coordinate system 40 of the sample. In this embodiment there is more than one carbon nanotube 126, as depicted in FIG. 20, where each nanotube oscillator 126 is responsible for detecting the component of the surface force vector 82 in the direction in which it extends. Therefore, the vertically oriented nanotube oscillator 126 is sensitive to vertical direction of the surface force interaction, and the horizontally (in X and Y) oriented nanotube oscillators 126 are sensitive to the horizontal (X and Y) directions of the surface force interaction 82. In this embodiment it is sufficient that each nanotube oscillator 126 utilize only one of its resonances because its orientation determines the direction of its sensitivity. Preferably, the single resonance of each nanotube oscillator 126 is the second bending mode 109 that will produce end-of-nanotube vibration that is oriented along its length and therefore it is sensitive to the direction of the surface force interaction 82 that is oriented along the length of the nanotube 126.

It will be appreciated by those skilled in the art having the benefit of this disclosure that this invention provides a system and method of multi-dimensional force sensing for scanning probe microscopy. Although just a few embodiments of the present invention have been described in detail herein, it should be understood that the drawings and detailed description herein are to be regarded in an illustrative rather than a restrictive manner, and are not intended to limit the invention to the particular forms and examples disclosed. On the contrary, the invention includes any further modifications, changes, rearrangements, substitutions, alternatives, design choices, and embodiments apparent to those of ordinary skill in the art, without departing from the spirit and scope of this invention, as defined by the following claims. Thus, it is intended that the following claims be interpreted to embrace all such further modifications, changes, rearrangements, substitutions, alternatives, design choices, and embodiments.

The invention claimed is:

1. A device, comprising:
   a support structure;
   at least one carbon nanotube extending from the support structure; and
   a detection system comprising an inductive pick-up coil and a tank circuit;
   wherein the detection system is operable to detect vibrations from the at least one carbon nanotube.

2. A device in accordance with claim 1, wherein the detection system is operable to detect at least one resonant frequency of the at least one carbon nanotube.

3. A device in accordance with claim 1, wherein the inductive pick-up coil and the tank circuit are coupled to the at least one carbon nanotube with an electromagnetic radiation.

4. A device in accordance with claim 1, wherein the inductive pick-up coil and the tank circuit are coupled to the at least one carbon nanotube with a magnetic field.

5. A device, comprising:
   a support structure;
   at least one at least one nanotube extending from the support structure, wherein the nanotube has a free end opposite an attachment to the support structure;
   a magnetic element coupled to the at least one nanotube near the free end of the at least one nanotube; and
   a detection system comprising an inductive pick-up coil and a tank circuit;
   wherein the detection system is operable to detect vibrations from the at least one nanotube.

6. A device in accordance with claim 5, wherein the detection system is operable to detect at least one resonant frequency of the carbon nanotube.

7. A device in accordance with claim 5, wherein the inductive pick-up coil and the tank circuit are coupled to the at least one nanotube with an electromagnetic radiation.

8. A device in accordance with claim 5, wherein the inductive pick-up coil and the tank circuit are magnetically coupled to the magnetic element.

9. A device, comprising:
   a support structure; and
   at least one nanotube grown directly onto and extending from the support structure; and
   a detection system comprising an inductive pick-up coil and a tank circuit;
   wherein the detection system is operable to detect vibrations from the at least one nanotube.

* * * * *